US008660769B2

(12) United States Patent  
Onoda et al.

(10) Patent No.: US 8,660,769 B2
(45) Date of Patent: Feb. 25, 2014

(54) VEHICLE MOTION CONTROL SYSTEM

(75) Inventors: Yuichi Onoda, Toyota (JP); Yutaka Ohnuma, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 36 days.

(21) Appl. No.: 13/379,040

(22) PCT Filed: Jun. 25, 2010

(86) PCT No.: PCT/JP2010/060853
§ 371 (c)(1),
(2), (4) Date: Dec. 19, 2011

(87) PCT Pub. No.: WO2011/161815
PCT Pub. Date: Dec. 29, 2011

(65) Prior Publication Data
US 2012/0109484 A1 May 3, 2012

(51) Int. Cl.
*B60T 8/00* (2006.01)
*B62D 61/00* (2006.01)
*B62D 61/02* (2006.01)
*B62D 61/04* (2006.01)
*B62D 61/06* (2006.01)

(52) U.S. Cl.
CPC . *B60T 8/00* (2013.01); *B62D 61/00* (2013.01); *B62D 61/02* (2013.01); *B62D 61/04* (2013.01); *B62D 61/06* (2013.01)
USPC .................... 701/73; 180/21; 701/71; 701/78

(58) Field of Classification Search
CPC ..... B60T 8/00; B60T 8/1755; B60T 8/17554; B60T 8/17555; B62D 61/00; B62D 61/02; B62D 61/04; B62D 61/06; B62D 61/08
USPC ........................ 701/48, 71–73, 75, 78, 80–82; 180/6.64, 15, 21, 235–238, 266, 267, 180/210–217
See application file for complete search history.

(56) References Cited

U.S. PATENT DOCUMENTS 3,828,876 A * 8/1974 Morelli ........................... 180/21
4,313,511 A * 2/1982 Soo Hoo ........................ 180/21
(Continued)

FOREIGN PATENT DOCUMENTS

CN    1 304 237     3/2007
JP    3 125687     12/1991
(Continued)

OTHER PUBLICATIONS

International Search Report Issued Sep. 28, 2010 in PCT/JP10/060853 filed Jun. 25, 2010.

*Primary Examiner* — John Q Nguyen
*Assistant Examiner* — Michael Whalen
(74) *Attorney, Agent, or Firm* — Oblon, Spivak, McClelland, Maier & Neustadt, L.L.P.

(57) ABSTRACT

A vehicle motion control system which is to be installed on a vehicle having a single front wheel, a right wheel and a left wheel. The control system includes: (a) a front-wheel steering device configured to steer the front wheel; (b) a braking device configured to apply a braking force to each of the wheels; and (c) a controlling device including a braking-force controlling portion configured to control the braking force that is to be applied to each of the wheels. The braking-force controlling portion includes a slip-management controlling portion configured, when the vehicle is to be braked in a direction-change situation that there is a change of a heading direction of the vehicle due to slip of at least one of the right and left wheels and/or when the vehicle is to be braked in a direction-change risk situation that there is a risk of the change of the heading direction of the vehicle, to execute a slip managing control, such that a magnitude of the braking force applied to the front wheel varies depending on a direction of turning of the front wheel.

14 Claims, 18 Drawing Sheets

(56) References Cited

U.S. PATENT DOCUMENTS

| | | | |
|---|---|---|---|
| 6,681,167 B2* | 1/2004 | Bedner et al. | 701/48 |
| 7,243,746 B1* | 7/2007 | Vasant | 180/6.5 |
| 7,315,777 B2* | 1/2008 | Ono | 701/70 |
| 7,567,865 B2* | 7/2009 | Koibuchi et al. | 701/70 |
| 8,301,353 B2* | 10/2012 | Ono et al. | 701/90 |
| 8,380,416 B2* | 2/2013 | Offerle et al. | 701/83 |
| 8,397,844 B2* | 3/2013 | Vasant | 180/65.1 |
| 2002/0198646 A1* | 12/2002 | Bedner et al. | 701/48 |
| 2004/0186647 A1* | 9/2004 | Ono | 701/70 |
| 2005/0205346 A1 | 9/2005 | Aizawa et al. | |
| 2009/0184572 A1* | 7/2009 | Yamada et al. | 303/140 |
| 2012/0185136 A1* | 7/2012 | Ohnuma et al. | 701/48 |

FOREIGN PATENT DOCUMENTS

| | | |
|---|---|---|
| JP | 5 278592 | 10/1993 |
| JP | 2005-247056 A | 9/2005 |
| JP | 2006 130985 | 5/2006 |
| JP | 2006 193087 | 7/2006 |
| JP | 2007 176314 | 7/2007 |

\* cited by examiner

VEHICLE MOTION CONTROL SYSTEM

TECHNICAL FIELD

The present invention relates to a vehicle having a single front wheel disposed in a front portion of the vehicle and right and left wheels disposed in respective right and left portions of the vehicle and located on a rear side of the front wheel, and more particularly to a system for controlling motion of the vehicle.

BACKGROUND ART

As a system for controlling motion of a vehicle having a single front wheel and right and left wheels that are located on a rear side of the front wheel, conventionally, there has been a technique relating to a control of turning motion of the vehicle, as disclosed in below-identified Patent Document 1. In recent years, there has been studied also a vehicle having, in addition to the three wheels, a single rear wheel located on a rear side of the right and left wheels, as disclosed in below-identified Patent Document 2.

PRIOR ART DOCUMENTS

Patent Documents

[Patent Document 1] JP-2006-130985A
[Patent Document 2] CN 1304237 C

SUMMARY OF THE INVENTION

Object to be Achieved by the Invention

The vehicle as described above is different, with respect to arrangement of the wheels, from an ordinary vehicle having front right and left wheels as two front wheels and rear right and left wheels as two rear wheels. It is therefore desirable that special considerations are required for controlling motion of the vehicle as described above. There is a room for improvement in control of motion of the vehicle as described above (hereinafter referred to as "special wheel-arrangement vehicle" where appropriate), so that it is possible to improve utility of the special wheel-arrangement vehicle, by introducing some improvements into the vehicle. The present invention was made in the light of the background art discussed above, and has an object of the invention to provide a vehicle motion control system for improving the utility of the special wheel-arrangement vehicle.

Measures for Achieving the Object

For achieving the above object, in a vehicle motion control system according to the present invention that is designed for the above-described special wheel-arrangement vehicle, a controlling device includes a controlling portion configured to control a braking device that is to apply a braking force to each of front, right and left wheels, wherein the controlling portion is configured, when the vehicle is to be braked in a direction-change situation that there is a change of a heading direction of the vehicle toward a particular direction due to slip of at least one of the right and left wheels and/or when the vehicle is to be braked in a direction-change risk situation that there is a risk of the change of the heading direction of the vehicle toward the particular direction, to execute a control for managing the change of the heading direction of the vehicle, such that a magnitude of the braking force applied to the front wheel varies depending on a direction of turning of the front wheel, even with a same operation being applied to the brake operating member.

Effects of the Invention

In the above-described special wheel-arrangement vehicle, when the vehicle is to be braked in the direction-change situation and/or when the vehicle is to be braked in the direction-change risk situation, there is a case where a turning moment, which is applied to a body of the vehicle as a result of application of the braking force to the front wheel, suppresses the change of the heading direction of the vehicle induced by wheel slip, and also a case where the turning moment enhances the change of the heading direction of the vehicle. Whether the turning moment suppresses or enhances the change of the heading direction of the vehicle depends on a direction of turning of the front wheel. In the vehicle motion control system according to the present invention, it is possible to avoid enhancement of the change of the heading direction of the vehicle induced by wheel slip or to effectively suppress the change of the heading direction of the vehicle, by changing the magnitude of the braking force applied to the front wheel, depending on the direction of turning of the front wheel, so that stability of the special wheel-arrangement vehicle during running of the vehicle can be improved.

MODES OF THE INVENTION

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein.

(1) A vehicle motion control system which is to be installed on a vehicle having a single front wheel, a right wheel and a left wheel, the single front wheel being disposed in a widthwise center of a front portion of the vehicle, the right and left wheels being disposed in respective right and left portions of the vehicle and located on a rear side of the single front wheel, the control system being configured to control motion of the vehicle, the control system comprising:

a front-wheel steering device configured to steer the front wheel;

a braking device configured to apply a braking force to each of the front wheel and right and left wheels; and a controlling device configured to execute control of the vehicle, the controlling device including a braking-force controlling portion configured to control the braking force that is to be applied to each of the front wheel and right and left wheels, by controlling the braking device in accordance with an operation applied to a brake operating member;

wherein the braking-force controlling portion includes a slip-management controlling portion configured, when the vehicle is to be braked in a direction-change situation that there is a change of a heading direction of the vehicle toward a particular direction due to slip of at least one of the right and left wheels and/or when the vehicle is to be braked in a direction-change risk situation that there is a risk of the change of the heading direction of the vehicle toward the particular direction, to execute a slip managing control for managing the change of the heading direction of the vehicle, such that a magnitude of the braking force applied to the front wheel varies depending on a direction of turning of the front wheel, even with a same operation being applied to the brake operating member.

A vehicle, on which the system according to this mode is to be installed, is the above-described special wheel-arrangement vehicle which may be either a three-wheeled vehicle having only the above-described front, right and left wheels or a vehicle (hereinafter referred to as "diamond-shaped wheel-arrangement vehicle" where appropriate) further having a single rear wheel that is located on a rear side of the right and left wheels. In such a special wheel-arrangement vehicle, since the front wheel is disposed in the widthwise central portion of the front portion of the vehicle, the turning moment applied to the vehicle body as a result of application of the braking force to the front wheel acts on a direction that varies depending on a direction of turning of the front wheel from its neutral position, namely, depending on which one of opposite sides of the neutral position the front wheel is being positioned in. The term "direction of turning of the front wheel", which is recited in this mode, means one of clockwise and counterclockwise directions about an axis of turning of the wheel from the neutral position. That is, when the vehicle is to be braked in the direction-change situation or in the direction-change risk situation, the moment generated by application of the braking force to the front wheel upon turning of the front wheel in one of the clockwise and counterclockwise directions serves to suppress the change (hereinafter referred to as "slip-induced vehicle-direction change" where appropriate) of the heading direction of the vehicle which is induced by wheel slip, and the moment generated by application of the braking force to the front wheel upon turning of the front wheel in the other of the clockwise and counterclockwise directions serves to enhance the slip-induced vehicle-direction change.

In the vehicle motion control system according to this mode, the magnitude of the braking force applied to the front wheel is caused to vary depending on the direction of the turning of the front wheel, even with a same operation being applied to the brake operating member, so that it is possible to vary an amount of the moment applied to the vehicle body, depending on whether the turning moment suppresses or enhances the slip-induced vehicle-direction change. That is, in the vehicle motion control system according to this mode, it is possible to avoid enhancement of the slip-induced vehicle-direction change or to effectively suppress the slip-induced vehicle-direction change, by controlling the braking device such that the braking force applied to the front wheel is made larger when the moment suppresses the slip-induced vehicle-direction change than when the moment enhances the slip-induced vehicle-direction change.

In a case where an ordinary vehicle (hereinafter referred to as "four-corners wheel-arrangement vehicle" where appropriate) is to be braked while the ordinary vehicle is spinning wherein the ordinary vehicle has two front steerable wheels as front right and left wheels and two rear wheels as rear right and left wheels, the moment applied to the vehicle by the braking force applied to one of the front right and left wheels, which is displaced rearwardly relative to the other of the front right and left wheels during spinning of the vehicle, always acts on a direction same as a direction of the spinning of the vehicle, while the moment applied to the vehicle by the braking force applied to the other of the front right and left wheels always acts on a direction opposite to the direction of the spinning of the vehicle. That is, an advantageous effect cannot be obtained by applying the "slip managing control" described in the present mode to the above-described four-corners wheel-arrangement vehicle, while the above-described advantageous effect can be obtained by applying the "slip managing control" to the above-described special wheel-arrangement vehicle.

The "slip" described in the present mode means that a magnitude of force applied to the wheel reaches neighborhood of limit of a friction force generated between the wheel and a road surface. The "force applied to the wheel" is a concept including a longitudinal-direction force in the form of a driving force and a braking force given to the wheel, a lateral-direction force in the form of a lateral force applied to wheel upon turning of the vehicle, and a resultant force of the longitudinal-direction force and the lateral-direction force. That is, the slip means that the force applied to the wheel reaches a friction circle, i.e., neighborhood of a maximum value of the friction force that acts at a center of a contact surface of the wheel which is in contact with the road surface. The meaning of the slip is not limited to a state where gripping of the wheel does not work at all. For example, the meaning of the slip includes also a state where the braking force applied to the wheel is controlled such the magnitude of the braking force is limited to a maximum magnitude that is allowed to be generated at a current point of time, as a result of activation of an anti-lock braking system (ABS) that is installed on the vehicle.

The "direction-change situation" described in this mode includes, for example, (i) a situation that spin or drift-out of the vehicle take places when the lateral force reaches the friction force because the right and left wheels pass on concavity and convexity of a road surface or a low friction-coefficient portion of the road surface during rapid or abrupt turning of the vehicle, and (ii) a situation that rotation of the vehicle takes place upon braking of the vehicle during running of the vehicle on a road surface with right and left wheels passing on respective portions of the road surface having respective friction coefficients that are different from each other by a large amount, wherein the rotation of the vehicle is caused by a difference between the braking force applied to the right wheel and the braking force applied to the left wheel when the braking force applied to one of the right and left wheels which passes on the lower friction portion of the road surface reaches the limit of the friction force. The "direction-change risk situation" described in this mode includes a situation that the vehicle is running on the road surface with the right and left wheels passing on respective portions of the road surface having respective friction coefficients that are different from each other by a large amount.

The "particular direction" described in this mode is either clockwise direction or counterclockwise direction as seen from an upper side of the vehicle. For example, when drift-out of the vehicle takes place during turning of the vehicle, the heading direction of the vehicle is actually changed toward a direction that is the same as the direction of the turning of the vehicle. In this instance, however, the particular direction, which is a direction of the change of the heading direction of the vehicle due to the slip of the wheel, corresponds to a direction away from a turning inside of the vehicle toward a turning outside of the vehicle, namely, corresponds to a direction opposite to the direction of the turning of the vehicle. That is, there is a case where the particular direction as the direction of the slip-induced vehicle-direction change is different from the direction in which the heading direction of the vehicle is actually changed.

As the "braking device" included in the system according to this mode, it is possible to employ any one of various braking devices such as a hydraulic braking device, an electric braking device and a braking device (e.g., regenerative brake) utilizing an electromotive force of a motor as a drive source. However, it is desirable to employ a device in which the braking forces applied to the front wheel and right and left wheels are controllable independently of one another.

The "front-wheel steering device" included in the system according to this mode may be either a steering device which is configured to turn the front wheel, relying on an operating force applied to a steering operating member by a vehicle operator, or a so-called steer-by-wire type steering device which includes a drive source and which is configured to turn the front wheel, relying on a force generated by the drive source that is controlled in accordance with an operation applied to a steering operating member that is mechanically separated from the steering device. It is noted that, as the steering operating member, it is possible to employ any one of various kinds of members such as a steering wheel, joystick and lever.

(2) The vehicle motion control system according to mode (1), wherein the slip-management controlling portion is configured to execute the slip managing control such that the braking force applied to the front wheel is made larger when the front wheel is turned in a direction same as the particular direction, than when the front wheel is turned in a direction opposite to the particular direction.

When the particular direction is the same as the direction of turning of the front wheel, the moment generated by application of the braking force to the front wheel serves to suppress the slip-induced vehicle-direction change. On the other hand, when the particular direction is opposite to the direction of turning of the front wheel, the moment generated by application of the braking force to the front wheel serves to enhance the slip-induced vehicle-direction change. Further, there is a relationship between the braking force applied to the wheel and the lateral force applied to the wheel upon turning of the vehicle, wherein a maximum magnitude of the lateral force is reduced with increase of the braking force. That is, in the system according to this mode, when the front wheel is turned in the direction same as the particular direction, the change of the heading direction of the vehicle toward the particular direction can be suppressed with less increase of the lateral force applied to the front wheel, as compared with when the front wheel is turned in the direction opposite to the particular direction. Therefore, in the case where there is a specific relationship between the turning direction of the front wheel and the particular direction wherein the turning direction of the front wheel is the same as the particular direction, this mode is a desirable mode for obtaining the above-described effect that the enhancement of the slip-induced vehicle-direction change can be avoided or the slip-induced vehicle-direction change can be effectively suppressed.

(3) The vehicle motion control system according to mode (2), wherein the slip-management controlling portion is configured to execute the slip managing control such that the braking force applied to the front wheel is made larger when an amount of turning of the front wheel in the direction same as the particular direction is large, than when the amount of turning of the front wheel in the direction same as the particular direction is small.

The "amount of turning of the wheel" described in this mode means an amount by which a direction of the wheel is changed from a straight running direction of the wheel which allows the vehicle to run straight, namely, means an amount by which the wheel is turned from its neutral position. That is, an angle of the direction of the wheel with respect to the straight running direction of the wheel is a kind of the amount of turning of the wheel. As described above, an increase of the braking force applied to the wheel leads to a reduction of the maximum magnitude of the lateral force applied to the wheel upon turning of the vehicle. In the system according to this mode, the braking force is made larger when the amount of turning of the front wheel is large, than when the amount of turning of the front wheel is small, so that an increase of the lateral force is restrained when the wheel turning amount is large. That is, in the system according to this mode, as compared with when the front-wheel turning amount is small, when the front-wheel turning amount is large, the lateral force applied to the front wheel is more restrained, and the moment arising from application of the braking force to the front wheel and acting in a direction opposite to the particular direction is made larger. Thus, the slip-induced vehicle-direction change can be effectively restrained when the front wheel is turned in the direction same as the particular direction. In the system according to this mode, for example, the slip managing control may be executed such that the braking force applied to the front wheel is changed depending on the front-wheel turning amount, namely, such that the braking force applied to the front wheel is increased with increase of the front-wheel turning amount. In this case, the braking force applied to the front wheel may be changed, depending on the front-wheel turning amount, in either a stepwise or continuous manner.

(4) The vehicle motion control system according to mode (2) or (3), wherein the slip-management controlling portion is configured to execute the slip managing control such that the braking force applied to the front wheel is made smaller when an amount of turning of the front wheel in the direction opposite to the particular direction is large, than when the amount of turning of the front wheel in the direction opposite to the particular direction is small.

In the system according to this mode, the braking force is made smaller when the amount of turning of the front wheel is large, than when the amount of turning of the front wheel is small, and a reduction of the lateral force is restrained when the wheel turning amount is large. That is, in the system according to this mode, as compared with when the front-wheel turning amount is small, when the front-wheel turning amount is large, the moment arising from application of the braking force to the front wheel and acting in a direction same as the particular direction is made smaller, and the lateral force is applied to the front wheel. Thus, the slip-induced vehicle-direction change can be effectively restrained when the front wheel is turned in the direction opposite to the particular direction. In the system according to this mode, for example, the slip managing control may be executed such that the braking force applied to the front wheel is changed depending on the front-wheel turning amount, namely, such that the braking force applied to the front wheel is reduced with increase of the front-wheel turning amount. In this case, the braking force applied to the front wheel may be changed, depending on the front-wheel turning amount, in either a stepwise or continuous manner.

(5) The vehicle motion control system according to any one of modes (1) to (4), wherein the braking-force controlling portion includes a target braking-force determining portion configured to determine a target braking-force magnitude as the magnitude of the braking force that is to be applied to each of the front wheel, right wheel and left wheel, such that the target braking-force magnitude is determined based on a product of a brake operation index indicating a degree of the operation applied to the brake operating member and a braking force gain determined for a corresponding one of the front wheel, right wheel and left wheel.

This mode contains an additional limitation relating to a manner for controlling the braking force. As the "brake operation index" described in this mode, it is possible to employ, for example, an amount of operation applied to the brake operating member and a magnitude of operating force applied to the brake operating member. The "braking force gain" for each of the wheels can be determined, for example, based on a part of a vehicle body weight (as a shared load) which acts on the corresponding wheel. Further, the braking force gain may be a value variable based on a certain parameter.

Where the braking force gain is a variable value, it is desirable that the braking force gain for each wheel is determined in a normal braking-force control, such that the magnitude of the braking force applied to the vehicle, i.e., a sum of the magnitudes of the braking forces applied to the respective wheels is constant with a same operation being applied to the brake operating member. That is, this desirable arrangement can be considered as an arrangement in which the braking force that is to be applied to the vehicle is distributed to the wheels and in which a braking-force distribution ratio, i.e., a ratio of the distribution of the braking force is variable. The braking force gain determined for each of the wheels can be considered as the braking-force distribution ratio for each of the wheels.

(6) The vehicle motion control system according to mode (5), wherein the slip-management controlling portion is configured to execute the slip managing control, by changing the braking force gain determined for the front wheel.

This mode contains an additional limitation relating to a manner for executing the slip managing control, wherein this limitation is added in the mode in which the braking-force controlling portion includes the target braking-force determining portion. Specifically described, in the system according to this mode, at least the braking force gain for the front wheel is changeable. The braking force gain for the front wheel may be a value variable depending on the direction of turning of the front wheel, so that the magnitude of braking force applied to the front wheel can be changed depending on the direction of turning of the front wheel.

(7) The vehicle motion control system according to any one of modes (1)-(6), wherein the front-wheel steering device includes a drive source, and is configured to turn the front wheel, relying on a force generated by the drive source, without relying on a force applied to a steering operating member.

(8) The vehicle motion control system according to mode (7), wherein the controlling device includes a front-wheel turning amount controlling portion that is configured to control an amount of turning of the front wheel, by controlling the drive source included in the front-wheel steering device, based on an operation applied to the steering operating member.

Each of the above two modes is a mode in which the front-wheel steering device is a steer-by-wire type steering device that is as described above. By employing the steer-by-wire type steering device, for example, the turning amount of the front wheel can be controlled depending on various parameters such as a running velocity of the vehicle and a velocity of operation applied to the steering operating member, for example. Owing to employment of the steer-by-wire type steering device, the turning amount of the front wheel does not necessarily have to be controlled only depending on an amount of operation applied to the steering operating member. That is, owing to the employment of the steer-by-wire type steering device, a degree of freedom for controlling the wheel turning amount can be made relatively high.

(9) The vehicle motion control system according to any one of modes (1) to (8), wherein the controlling device includes a slip judging portion configured to judge whether the vehicle is in the direction-change situation and/or whether the vehicle is in the direction-change risk situation, wherein the slip judging portion is configured to judge that the vehicle is in the direction-change situation, when a yawing index indicating a degree of change of the heading direction of the vehicle exceeds a threshold value, and wherein the slip-management controlling portion is configured to execute the slip managing control, based on judgment made by the slip judging portion.

This mode specifies a manner for judging whether the vehicle is in the direction-change situation and/or whether the vehicle is in the direction-change risk situation, wherein it is judged whether the vehicle is in a situation that the heading direction of the vehicle is being changed due to wheel slip, and wherein the slip managing control is executed when it is judged that the vehicle is in such a situation. As the "yawing index" described in this mode, it is possible to employ, for example, at least one of an amount of actual yaw rate, a deviation of the actual yaw rate from a target yaw rate, a change of an angle of sideslip of the vehicle body (i.e., angle of sideslip at center of gravity), a rate of the change of the angle of sideslip of the vehicle body, and a deviation of an actual vehicle-body sideslip angle from a target vehicle-body sideslip angle.

(10) The vehicle motion control system according to any one of modes (1) to (9), wherein the controlling device includes a slip judging portion configured to judge whether the vehicle is in the direction-change situation and/or whether the vehicle is in the direction-change risk situation, wherein the slip judging portion is configured to judge that the vehicle is in the direction-change situation or that the vehicle is in the direction-change risk situation, when the vehicle is running on a road surface with the right and left wheels passing on respective portions of the road surface which have respective friction coefficients different from each other, and wherein the slip-management controlling portion is configured to execute the slip managing control, based on judgment made by the slip judging portion.

This mode specifies a manner for judging whether the vehicle is in the direction-change situation and/or whether the vehicle is in the direction-change risk situation, wherein it is judged whether the vehicle is in a situation that there is a risk of the change of the heading direction of the vehicle due to wheel slip, and wherein the slip managing control is executed when it is judged that the vehicle is in such a situation. In the system according to this mode, the slip managing control is executed when, in short, the vehicle is running on a so-called crossover road.

When the vehicle is to be braked during running of the vehicle on a crossover road, a force applied to one (hereinafter will be referred to as "low-friction-coefficient-side wheel" where appropriate) of the right and left wheels which passes on a portion of the road surface having a lower friction coefficient reaches the limit of a friction force generated between the wheel and the road surface at a stage earlier than a force applied to the other (hereinafter will be referred to as "high-friction-coefficient-side wheel" where appropriate) of the right and left wheels which passes on another portion of the road surface having a higher friction coefficient reaches the limit of a friction force generated between the wheel and the road surface. That is, when the vehicle is to be braked during running of the vehicle on the crossover road, the low-friction-coefficient-side wheel is placed in a state of the above-described slip at a stage earlier than the high-friction-coefficient-side wheel. Then, when the low-friction-coefficient-side wheel placed in the slip state is locked, or when the magnitude of the braking force applied to the low-friction-coefficient-side wheel is kept, by activation of the anti-lock braking system (ABS) installed on the vehicle, in the neighborhood of a maximum magnitude that is allowed to be generated during running on the low-friction-coefficient portion of the road surface, the magnitude of the braking force applied to the low-friction-coefficient-side wheel is made smaller than the magnitude of the braking force applied to the high-friction-coefficient-side wheel, so that the magnitudes of the braking forces applied to the respective right and left wheels are made different from each other, thereby inducing the change of the heading direction of the vehicle due to wheel slip. In the system according to this mode, the judgment leading to execution of the slip managing control is made not only in the direction-change situation but also in the direction-change risk situation. That is, in the system according to this mode, the judgment leading to execution of the slip managing control is made even before the heading direction of the vehicle starts to be actually changed, so that it is possible to start the execution of the slip managing control concurrently with start of brake application and accordingly to effectively suppress the slip-induced vehicle-direction change.

In the system according to the above-described mode in which the slip managing control is executed by changing the braking force gain, the braking force gain may be changed from a point of time at which judgment is made by the above-described slip judging portion.

(11) The vehicle motion control system according to mode (10), wherein the slip-management controlling portion is configured to regard that the front wheel is turned in a direction same as the particular direction when the front wheel is turned in a direction toward a high-friction coefficient portion of the road surface away from a low-friction coefficient portion of the road surface which has a lower friction coefficient than the high-friction coefficient portion of the road surface, and is configured to regard that the front wheel is turned in a direction opposite to the particular direction when the front wheel is turned in a direction toward the low-friction coefficient portion of the road surface away from the high-friction coefficient portion of the road surface, and wherein the slip-management controlling portion is configured to execute the slip managing control such that the braking force applied to the front wheel is made larger when the front wheel is turned in the direction same as the particular direction, than when the front wheel is turned in the direction opposite to the particular direction.

This mode specifies the particular direction and also a relationship between the particular direction and the direction of turning of the front wheel, when the vehicle is braked during running of the vehicle on a crossover road. As described above, since the magnitude of the braking force applied to the low-friction-coefficient-side wheel is made smaller than the magnitude of the braking force applied to the high-friction-coefficient-side wheel, so that, due to the braking force difference, the heading direction of the vehicle is changed such that a front portion of the vehicle is directed in a direction away from the low-friction-coefficient portion of the road surface toward the high-friction-coefficient portion of the road surface. That is, the direction away from the low-friction-coefficient portion of the road surface toward the high-friction-coefficient portion of the road surface corresponds to the particular direction. Therefore, this mode can be considered as a kind of the above-described mode in which "the braking force applied to the front wheel is made larger when an amount of turning of the front wheel in the direction same as the particular direction is large, than when the amount of turning of the front wheel in the direction same as the particular direction is small".

(12) The vehicle motion control system according to mode (11), wherein the slip-management controlling portion is configured to execute the slip managing control such that the braking force applied to the front wheel is larger when the front wheel is turned by a large amount in the direction toward the high-friction coefficient portion of the road surface away from the low-friction coefficient portion of the road surface, than when the front wheel is turned by a small amount in the direction toward the high-friction coefficient portion of the road surface away from the low-friction coefficient portion of the road surface.

(13) The vehicle motion control system according to mode (11) or (12), wherein the slip-management controlling portion is configured to execute the slip managing control such that the braking force applied to the front wheel is smaller when the front wheel is turned by a large amount in the direction toward the low-friction coefficient portion of the road surface away from the high-friction coefficient portion of the road surface, than when the front wheel is turned by a small amount in the direction toward the low-friction coefficient portion of the road surface away from the high-friction coefficient portion of the road surface.

Each of the above two modes is a mode in which the magnitude of the braking force applied to the front wheel is changed depending on the turning amount of the front wheel, when the vehicle is to be braked during running of the vehicle on a crossover road. The above two modes can be considered as the above-described modes, one of which is "a mode in which the braking force applied to the front wheel is made larger when an amount of turning of the front wheel in the direction same as the particular direction is large, than when the amount of turning of the front wheel in the direction same as the particular direction is small", and the other of which is "a mode in which the braking force applied to the front wheel is made smaller when an amount of turning of the front wheel in the direction opposite to the particular direction is large, than when the amount of turning of the front wheel in the direction opposite to the particular direction is small". Thus, in each of the above two modes, it is possible to obtain substantially the same effect that is obtained in a corresponding one of the above-described modes.

(14) The vehicle motion control system according to any one of modes (1) to (13), wherein the slip-management controlling portion is configured to execute the slip managing control such that the braking force applied to one of the right and left wheels, which is displaced rearwardly relative to the other of the right and left wheels upon rotation of the vehicle in the particular direction, is reduced.

This mode contains an additional limitation relating to the control of the braking force applied to each of the right and left wheels during execution of the slip managing control. In the system according to this mode, the slip-induced vehicle-direction change can be suppressed by eliminating a difference between the right and left wheels with respect to a longitudinal-direction component (hereinafter will be referred to as "friction-force braking component" where appropriate) of the friction force actually generated between the wheel and the road surface. In other words, the friction-force braking component acting on one (hereinafter will be referred to as "rearwardly-displaced wheel" where appropriate) of the right and left wheels, which is displaced rearwardly relative to the other of the right and left wheels upon rotation of the vehicle in the particular direction is made smaller than the friction-force braking component acting on the other of the right and left wheels, which is displaced forwardly relative to the rearwardly-displaced wheel upon the rotation of the vehicle in the particular direction, for thereby generating a moment which is based on the difference with respect to the friction-force braking component and which acts in a direction against the slip-induced vehicle-direction change, and accordingly making it possible to effectively suppress the slip-induced vehicle-direction change.

(15) The vehicle motion control system according to mode (14), wherein the slip-management controlling portion is configured to execute the slip managing control such that the braking force applied to the one of the right and left wheels, which is displaced rearwardly relative to the other of the right and left wheels upon the rotation of the vehicle in the particular direction, is smaller when a yawing index indicating a degree of change of the heading direction of the vehicle is large, than when the yawing index is small.

This mode is a mode in which the difference between the right and left wheels with respect to the friction-force braking component is changed based on a degree of the slip-induced vehicle-direction change. In the system according to this mode, when a value of the yawing index is small, the vehicle can be braked by the braking force applied to the rearwardly-displaced wheel while the slip-induced vehicle-direction change can be suppressed by controlling the braking force applied to the front wheel. Further, in the system according to this mode, when the value of the yawing index is large, the slip-induced vehicle-direction change can be further effectively suppressed by controlling the braking force applied to the front wheel and changing the difference between the right and left wheels with respect to the friction-force braking component. This mode may be a mode in which the braking force applied to the rearwardly-displaced wheel is reduced depending on the value of the yawing index, namely, a mode in which the slip managing control is executed such that the braking force applied to the rearwardly-displaced wheel is reduced with increase of the value of the yawing index. In this case, the braking force applied to the rearwardly-displaced wheel may be changed, depending on the value of the yawing index, in either a stepwise or continuous manner.

(21) The vehicle motion control system according to any one of modes (1) to (15), which is configured to control the motion of the vehicle further having a single rear wheel located on a rear side of the right and left wheels.

The system according to this mode is a system by which the above-described diamond-shaped wheel-arrangement vehicle is a subject to be controlled. The rear wheel of the subjected vehicle may be either a brakable wheel whose rotation is to be braked for braking the vehicle or a non-brakable wheel whose rotation is not to be braked. Further, the rear wheel may be either a steerable wheel that is to be turned or a non-steerable wheel that is not to be turned. It is noted that, in the present description, the "steerable wheel" means a wheel that is controllable by, for example, an operation applied to a steering operating member or suitable controlling means such that an amount of turning of the wheel can be controlled to an arbitrary amount. For example, a wheel, whose direction is freely changeable as a caster, is a non-steerable wheel rather than a steerable wheel. A wheel, whose direction is fixed, is a non-steerable wheel, too.

(22) The vehicle motion control system according to mode (21),
wherein the braking device is configured to apply the braking force to each of the front wheel, right and left wheels and rear wheel,
and wherein the braking-force controlling portion is configured to control the braking force that is to be applied to each of the front wheel, right and left wheels and rear wheel.

This mode is a mode in which the braking force is applicable to the rear wheel, namely, is a mode in which all of the four wheels are brakable wheels.

(23) The vehicle motion control system according to mode (22), wherein the slip-management controlling portion is configured to execute the slip managing control such that a magnitude of the braking force applied to the rear wheel varies depending on a direction of turning of the front wheel, even with a same operation being applied to the brake operating member.

This mode is a mode in which not only the magnitude of the braking force applied to the front wheel but also the magnitude of the braking force applied to the rear wheel is changeable depending on the direction of turning of the front wheel. In the system according to this mode, it is possible to compensate the braking force applied to the front wheel, which is reduced by execution of the slip managing control, as described later in detail. Further, where the rear wheel is a steerable wheel, the braking force applied to the rear wheel may be controlled in view of the direction of turning of the rear wheel.

(24) The vehicle motion control system according to mode (23), wherein the slip-management controlling portion is configured to execute the slip managing control, such that the braking force applied to the front wheel is smaller when the front wheel is turned in the direction opposite to the particular direction, than when the front wheel is turned in the direction same as the particular direction, and such that the braking force applied to the rear wheel is made larger when the front wheel is turned in the direction opposite to the particular direction, than when the front wheel is turned in the direction same as the particular direction.

In the system according to this mode, when the front wheel is turned in the direction opposite to the particular direction, the braking force applied to the front wheel is reduced for thereby making it possible to avoid the slip-induced vehicle-direction change from being enhanced by a moment generated by application of the braking force to the front wheel and making it possible to cause the reduction of the braking force applied to the front wheel, to be compensated by the braking force applied to the rear wheel. That is, in the system according to this mode, the slip-induced vehicle-direction change can be suppressed while the reduction of the braking force applied to the vehicle can be restrained. It is noted that, in the system according to this mode, the magnitude of the braking force applied to the front wheel and the magnitude of the braking force applied to the rear wheel may be changed depending on the amount of turning of the front wheel. Specifically described, when the front wheel is turned in the direction same as the particular direction, the braking force applied to the front wheel and the braking force applied to the rear wheel are increased and reduced, respectively, with increase of the amount of turning of the front wheel. When the front wheel is turned in the direction opposite to the particular direction, the braking force applied to the front wheel and the braking force applied to the rear wheel are reduced and increased, respectively, with increase of the amount of turning of the front wheel.

(25) The vehicle motion control system according to mode (24), wherein the slip-management controlling portion is configured to execute the slip managing control, such that a sum of the braking force applied to the front wheel and the braking force applied to the rear wheel is constant while a same operation is being applied to the brake operating member.

This mode is simply described as a mode in which the braking-force distribution proportion between the front and rear wheels is changeable. In the system according to this mode, the rear wheel is provided with also a braking force corresponding to a reduction of the braking force applied to the front wheel, for thereby making it possible to avoid the braking force applied to the vehicle, from being reduced by execution of the slip managing control.

(26) The vehicle motion control system according to any one of modes (23) to (25), wherein the braking-force controlling portion includes a target braking-force determining portion configured to determine a target braking-force magnitude as the magnitude of the braking force that is to be applied to each of the front wheel, right wheel, left wheel and rear wheel, such that the target braking-force magnitude is determined based on a product of a brake operation index indicating a degree of the operation applied to the brake operating member and a braking force gain determined for a corresponding one of the front wheel, right wheel, left wheel and rear wheel, and wherein the slip-management controlling portion is configured to execute the slip managing control, by changing the braking force gain determined for each of the front wheel and rear wheel.

This mode is a mode employing, in the diamond-shaped wheel-arrangement vehicle, the above-described mode in which "the target braking-force magnitude is determined based on the product of the brake operation index and the braking force gain". Specifically described, at least the braking force gain for each of the front and rear wheels is changeable, so that the braking force applied to each of the front and rear wheels can be changed depending on the direction of turning of the front wheel, by changing the braking force gain for the each of the front and rear wheels depending on the direction of turning of the front wheel.

(27) The vehicle motion control system according to mode (26), wherein the slip-management controlling portion is configured to execute the slip managing control, such that the braking force gain determined for the front wheel is smaller when the front wheel is turned in the direction opposite to the particular direction, than when the front wheel is turned in the direction same as the particular direction, and such that the braking force gain determined for the rear wheel is made larger when the front wheel is turned in the direction opposite to the particular direction, than when the front wheel is turned in the direction same as the particular direction.

This mode is a mode in which, where the braking force gain for each of the front and rear wheels is changeable, the slip managing control is executed such that the braking force applied to the front wheel and the braking force applied to the rear wheel are made smaller and larger when the front wheel is turned in the direction opposite to the particular direction, than when the front wheel is turned in the direction same as the particular direction. That is, in the system according to this mode, it is possible to restrain the reduction of the braking force applied to the front wheel and to suppress the slip-induced vehicle-direction change, by compensating the reduction of the braking force applied to the front wheel, with the braking force applied to the rear wheel.

(28) The vehicle motion control system according to any one of modes (21)-(27), comprising a rear-wheel steering device configured to steer the rear wheel.

This mode is a mode in which the rear wheel is the steerable wheel. Like the above-described front-wheel steering device, the "rear-wheel steering device" included in the system according to this mode may be either a steering device which is configured to turn the rear wheel, relying on an operating force applied to a steering operating member by a vehicle operator, or a so-called steer-by-wire type steering device.

(29) The vehicle motion control system according to mode (28), wherein the rear-wheel steering device includes a drive source, and is configured to turn the rear wheel, relying on a force generated by the drive source, without relying on a force applied to the steering operating member.

(30) The vehicle motion control system according to mode (29), wherein the controlling device includes a rear-wheel turning amount controlling portion that is configured to control an amount of turning of the rear wheel, by controlling the drive source included in the rear-wheel steering device, based on an operation applied to the steering operating member.

Each of the above two modes is a mode in which the rear-wheel steering device is a steer-by-wire type steering device that is as described above, where the vehicle, whose motion is to subjected to be controlled, is a diamond-shaped wheel-arrangement vehicle. By employing the steer-by-wire type steering device for controlling turning of the rear wheel, turning performance of the vehicle can be more satisfactory Like the turning amount of the front wheel, the turning amount of the front wheel does not necessarily have to be controlled depending on an amount of operation applied to the steering operating member. That is, owing to the employment of the steer-by-wire type steering device as the rear-wheel steering device, a degree of freedom for controlling the wheel turning amount can be made relatively high.

In the following description, it will be described that the front and rear wheels are turned in the same phase, when the front and rear wheels are turned in respective directions same to each other, and it will be described that the front and rear wheels are turned in opposite phases, when the front and rear wheels are turned in respective directions opposite to each other. In the system according to this mode, the rear wheel may be turned either in the same phase as the front wheel or in the phase opposite to the front wheel. For example, the turning of the rear wheel may be controlled such that it is determined whether the rear wheel is to be turned in the same phase as the front wheel or in the phase opposite to the front wheel, depending on the running velocity of the vehicle. Described more specifically, the turning of the rear wheel may be controlled, such that, when the vehicle running velocity is high, the rear wheel is turned in the same phase as the front wheel in view of running stability of the vehicle, for example, and such that, when the vehicle running velocity is low, the rear wheel is turned in the phase opposite to the front wheel in view of improvement of turning performance of the vehicle (i.e., performance for easiness to change the heading direction of the vehicle).

(31) The vehicle motion control system according to mode (30), wherein the rear-wheel turning amount controlling portion includes a slip-management controlling portion that is configured, when the slip managing control is executed by the slip-management controlling portion included in the braking-force controlling portion, to control the amount of turning of the rear wheel, for managing the change of the heading direction of the vehicle, such that the rear wheel is turned in a direction same as the particular direction.

In the "slip managing control that is to be executed by the rear-wheel turning amount controlling portion", the rear wheel is turned in counterclockwise direction when the particular direction is the counterclockwise direction as seen from an upper side of the vehicle, and the rear wheel is turned in clockwise direction when the particular direction is the clockwise direction as seen from the upper side of the vehicle. Thus, by turning the rear wheel in the same direction as the particular direction, the lateral force acting on the rear wheel generates a moment acting in a direction against the slip-induced vehicle-direction change, so that the slip-induced vehicle-direction change can be effectively suppressed in the system according to this mode.

(32) The vehicle motion control system according to mode (31), wherein the slip-management controlling portion included in the rear-wheel turning amount controlling portion is configured to control the amount of turning of the rear wheel, such that the amount of turning of the rear wheel is made larger when a yawing index indicating a degree of change of the heading direction of the vehicle is large, than when the yawing index is small.

This mode is a mode in which the amount of turning of the rear wheel is controlled based on the degree of the slip-induced vehicle-direction change in execution of the slip managing control. This mode may be a mode in which the amount of turning of the rear wheel is increased depending on the value of the yawing index, namely, a mode in which the amount of turning of the rear wheel is increased with increase of the value of the yawing index.

(33) The vehicle motion control system according to mode (31) or (32),
wherein the braking device is configured to apply the braking force to each of the front wheel, right and left wheels and rear wheel,
wherein the braking-force controlling portion is configured to control the braking force that is to be applied to each of the front wheel, right and left wheels and rear wheel,
and wherein the slip-management controlling portion included in the braking-force controlling portion is configured to cause the magnitude of the braking force applied to the rear wheel, to become zero, when a yawing index indicating a degree of change of the heading direction of the vehicle exceeds a given value.

The system according to this mode is a system by which the vehicle having the rear wheel as the steerable and brakable wheel is a subject to be controlled. When the rear wheel is turned in the direction same as the particular direction in the slip managing control executed by the rear-wheel turning amount controlling portion, the moment generated by the braking force applied to the rear wheel acts in a direction enhancing the slip-induced vehicle-direction change. In the system according to this mode, when the degree of the slip-induced vehicle-direction change becomes large, the slip-induced vehicle-direction change can be effectively suppressed, by avoiding the moment that enhances the slip-induced vehicle-direction change, from being generated by the braking force applied to the rear wheel. The "given value" described in this mode is larger than the threshold value of the yawing index which is used in the judgment made by the slip judging portion.

EMBODIMENT FOR CARRYING OUT THE INVENTION

There will be described, as an example, a typical embodiment of the claimable invention, by reference to the accompanying drawings. It is to be understood that the claimable invention is not limited to the below-described embodiment, and may be otherwise embodied with various changes and modifications, such as those described in the foregoing "MODES OF THE INVENTION", which are based on knowledge of those skilled in the art.

Embodiment

<Construction of Vehicle>

Figure 1:
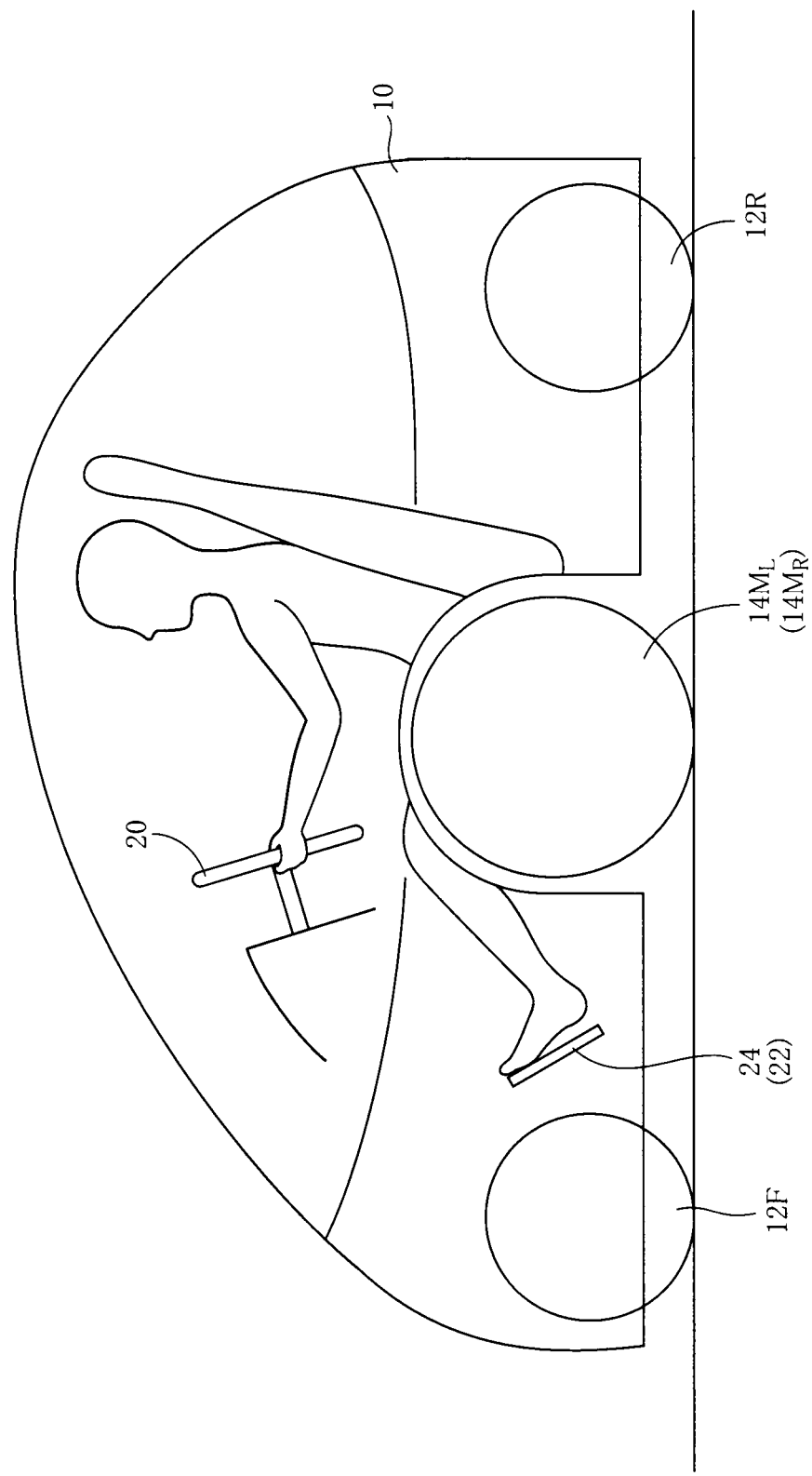
FIG. 1 is a side view schematically showing a vehicle on which a vehicle motion control system according to an embodiment of the claimable invention is installed.

FIG. 1 shows a vehicle on which a vehicle motion control system as an embodiment of the claimable invention is installed. This vehicle is a diamond-shaped wheel-arrangement vehicle, and is expected as a next-generation commuter. This vehicle has: a vehicle body 10; a front wheel 12F disposed in a front portion of the vehicle body 10; right and left wheels $14M_R$, $14M_L$ disposed in respective right and left portions of the vehicle body 10 and located on a rear side of the front wheel 12F; and a rear wheel 12R located on a rear side of the right and left wheels $14M_R$, $14M_L$. As is understood from FIG. 2 that is a plan view of the vehicle, the front wheel 12F and the rear wheel 12R are disposed in a central portion of the vehicle body 10 in a width direction of the vehicle body 10. In the following description, each of the front wheel 12F and rear wheel 12R will be referred simply to as "wheel 12", where it is not necessary to clarify which one of the front and rear wheels 12F, 12R the referred wheel 12 relates to. Similarly, each of the right wheel $14M_R$ and left wheel $14M_L$ will be referred simply to as "wheel 14", where it is not necessary to clarify which one of the right and left wheels $14M_R$, $14M_L$ the referred wheel 14 relates to. Further, each of components and parameters relating to the front and rear wheels 12F, 12R and right and left wheels $14M_R$, $14M_L$ will be referred together with, as a suffix, one of reference signs F, R, $M_R$ and $M_L$ indicative of respective wheel positions, where it is necessary to clarify which one of the front and rear wheels 12F, 12R and right and left wheels $14M_R$, $14M_L$ the referred component or parameter relates to.

As described later in detail, in the present vehicle, the front wheel 12F and the rear wheel 12R are steerable wheels while the right and left wheels $14M_R$, $14M_L$ are not steerable wheels. Further, the right and left wheels $14M_R$, $14M_L$ are drive wheels (i.e., wheels that are to be driven for driving the vehicle) while the front and rear wheels 12F, 12R are not drive wheels. Further, all of the front and wheel 12F, 12R and right and left wheels $14M_R$, $14M_L$ are brakable wheels (i.e., wheels that are to be braked for braking the vehicle).

The present vehicle is provided with three operating members that are operable by a vehicle operator for operating the vehicle. One of the three operating members is a steering wheel 20 as a steering operation member for turning the vehicle. Another one of the three operating members is an accelerator pedal 22 as an acceleration operating member for accelerating the vehicle. Still another one of the three operating members is a brake pedal 24 as a brake operating member for decelerating the vehicle. It is noted that, although the present vehicle can run not only forwardly but also rearwardly, the following description will be made with respect to only the forward running of the vehicle, so as to avoid redundancy of description.

Figure 3:
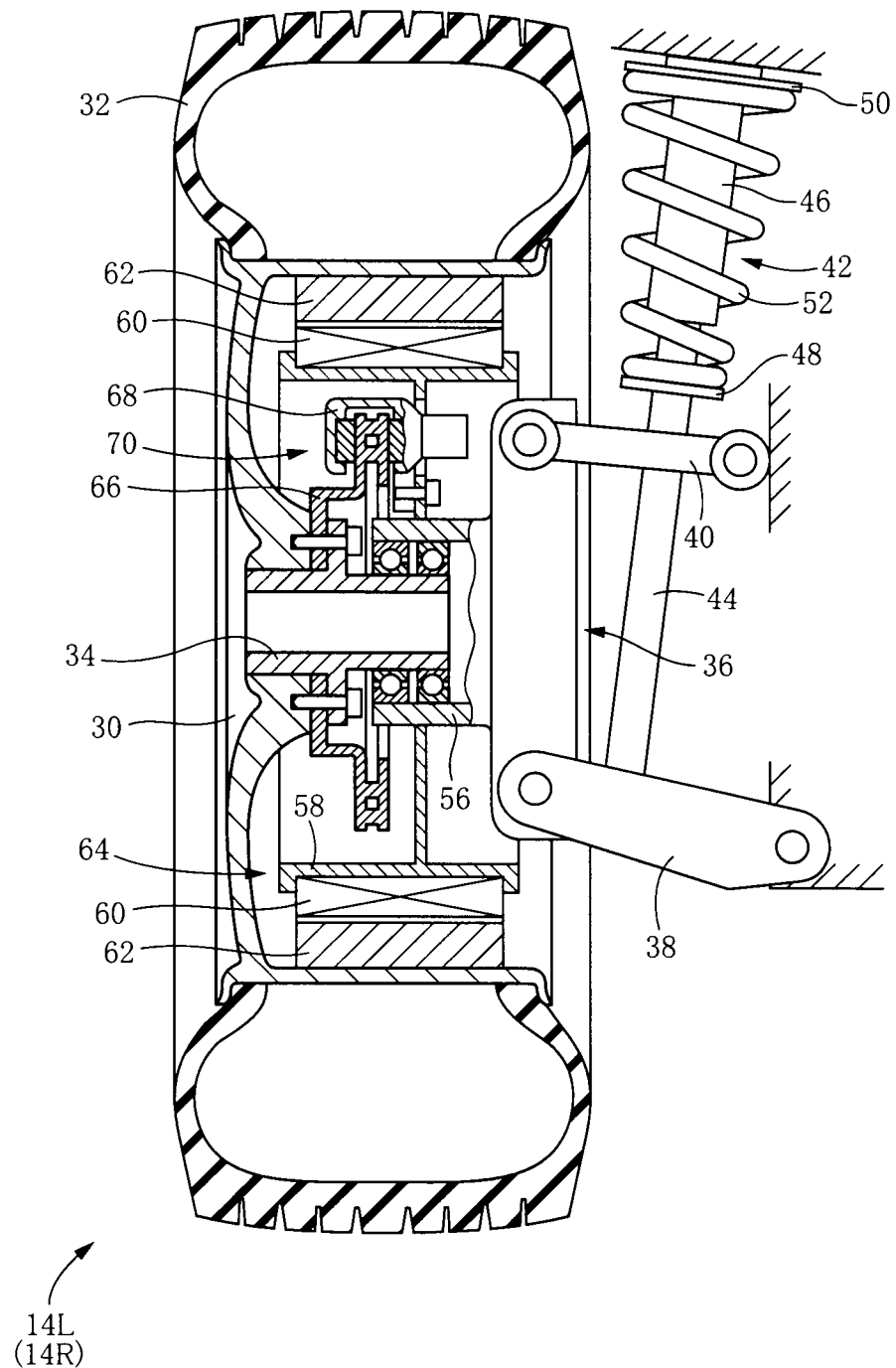
FIG. 3 is a cross sectional view showing a left wheel (right wheel) of the vehicle of FIG. 1 and a driving device and a braking device that are provided for the wheel.

Regarding the right and left wheels $14M_R$, $14M_L$, as is understood from FIG. 3, each of the wheels 14 is constituted by a wheel body 30 and a tire 32. The wheel body 30 is fixed to an axle 34 that is rotatably held by a carrier 36. The carrier 36 is held by a lower arm 38 and an upper arm 40 as suspension arms that constitute a suspension device, such that the carrier 36 is rockable relative to the vehicle body. A hydraulic shock absorber 42 is attached at its lower end portion to the lower arm 38, and is supported at its upper end portion to the vehicle body 10.

The hydraulic shock absorber 42 has a lower tube 44 and an upper tube 46, which are movable relative to each other for enabling the shock absorber 42 to be extended and contracted. A lower retainer 48 is fixed to the lower tube 44 while an upper retainer 50 is fixed to the upper tube 46, such that a suspension spring 52 is gripped between the lower and upper retainers 48, 50. Owing to such a construction, each wheel 14 is rotatable and rockable vertically in an elastic manner.

The carrier 36 has a coil holding portion 58 having a short cylindrical shape. The coil holding portion 58 is disposed outside a hub portion 56 holding the axle 34, and holds a plurality of coils 60 which are disposed in an outer peripheral portion of the coil holding portion 58 and which cooperate to constitute an electromagnetic motor. Meanwhile, a plurality of magnets 62 are disposed on an inner circumferential surface of a rim portion of the wheel body 30. The plurality of coils 60 and the plurality of magnets 62 are mutually opposed, and cooperate to constitute a brushless DC motor. That is, each wheel 14 is to be driven by an in-wheel motor which is built inside the wheel body 30 and which functions as a driving device 64 of the vehicle. Although it will not be described in detail, the in-wheel motor functions also as a generator owing to rotation of the wheel 14. The driving device 64 functions also as a regenerative braking device, by storing an electric current generated by an electromotive force of the in-wheel motor.

A brake disk 66 is fixed to the axle 34, while a caliper device 68 holding a brake pad is fixed to the carrier 36. The caliper device 68 is configured to cause the brake pad to be pressed against the brake disk 66 by a force of the electromagnetic motor. That is, the present vehicle has a disk braking device 70 that is constituted by the brake disk 66 and the caliper device 68.

Figure 4:
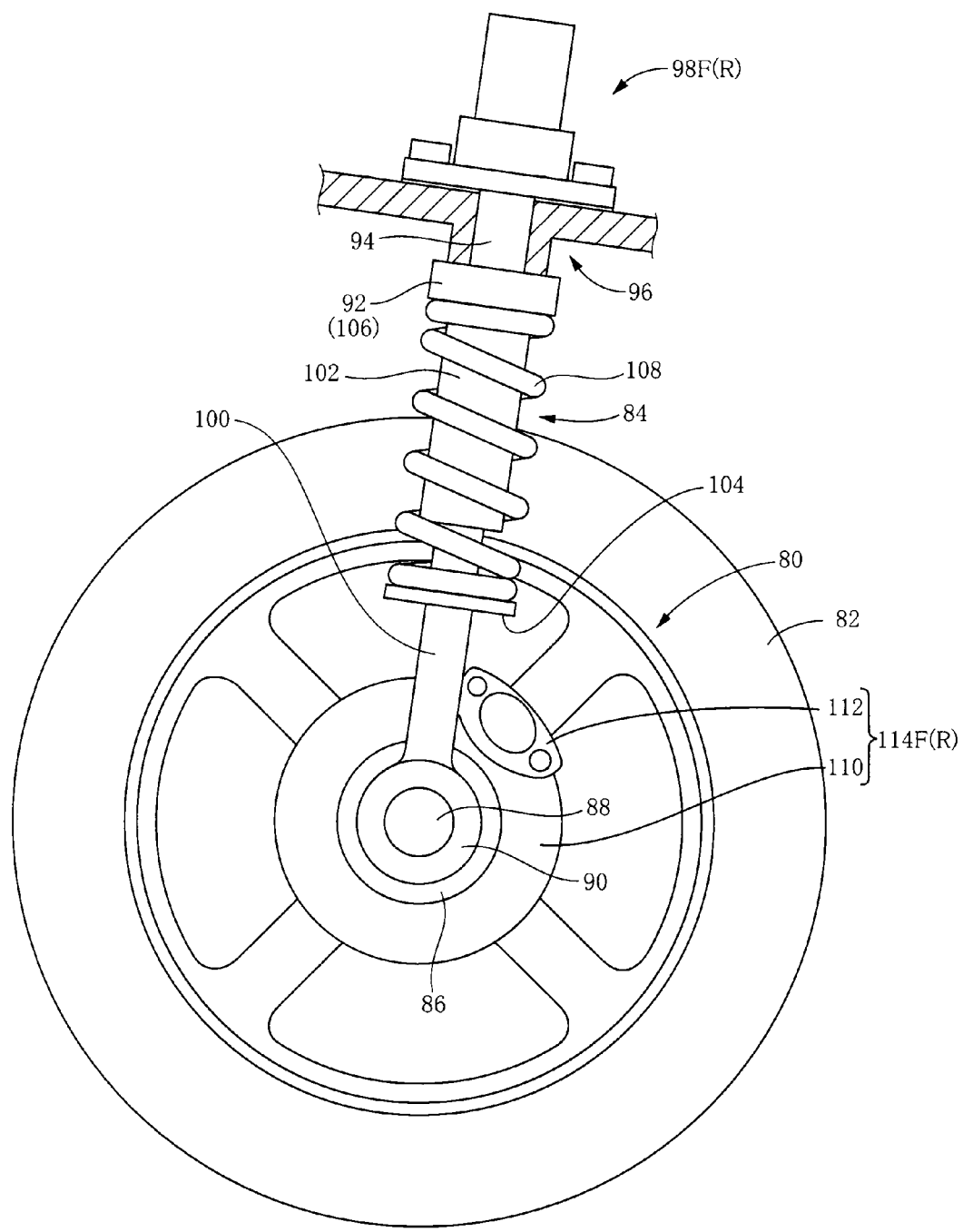
FIG. 4 is a cross sectional view showing a front wheel (rear wheel) of the vehicle of FIG. 1 and a steering device and a braking device that are provided for the wheel.

Regarding the front and rear wheels 12F, 12R, as is understood from FIG. 4, each of the wheels 12 is constituted by a wheel body 80 and a tire 82. The wheel body 80 is gripped by a pair of hydraulic shock absorbers 84 that are located on respective right and left sides of the wheel body 80. Described in detail, the axle 88 provided in the hub portion 86 of the wheel body 80 is rotatably held by bearing portions 90 that are provided in respective lower end portions of the respective shock absorbers 84, whereby the wheel 12 is rotatable.

The shock absorbers 84 are fixed at their respective upper end portions to a supporting plate 92 which extends in the width direction of the vehicle and which interconnects the upper end portions of the respective shock absorbers 84. A shaft 94 is fixedly provided in the supporting plate 92, and is rotatably held by a bearing portion 96 that is provided in the vehicle body. The shaft 94 has a protruding portion that protrudes upwardly from the bearing portion 96, so that the wheel 12 can be turned by rotating the protruding portion of the shaft 94 by a steering device 98. The steering device 98 has an electromagnetic motor, and activation of the electromagnetic motor is controlled for causing the wheel 12 to be turned by a desired degree of angle. It is noted that the steering device 98 has a stopper for avoiding the wheel 12 to be turned by 90° or more in right and left directions.

Each of the pair of shock absorbers 84 has a lower tube 100 and an upper tube 102, which are movable relative to each other for enabling the shock absorber 84 to be extended and contracted. A lower retainer 104 is fixed to the lower tube 100 while an upper retainer 106 is fixed to the upper tube 102, and the lower and upper retainers 104, 106 cooperate to grip a corresponding one of suspension springs 108. Owing to such a construction, the wheel 12 is vertically rockable in an elastic manner.

A brake disk 110 is fixed to the axle 88, while a caliper device 112 holding a brake pad is fixed to the lower tube 100. The caliper device 112 is configured to cause the brake pad to be pressed against the brake disk 110 by a force of the electromagnetic motor. That is, like each of the right and left wheels $14M_L$, $14M_R$, each of the front and rear wheels 12F, 12R has a disk braking device 114.

<Construction of Vehicle Motion Control System>

Figure 2:
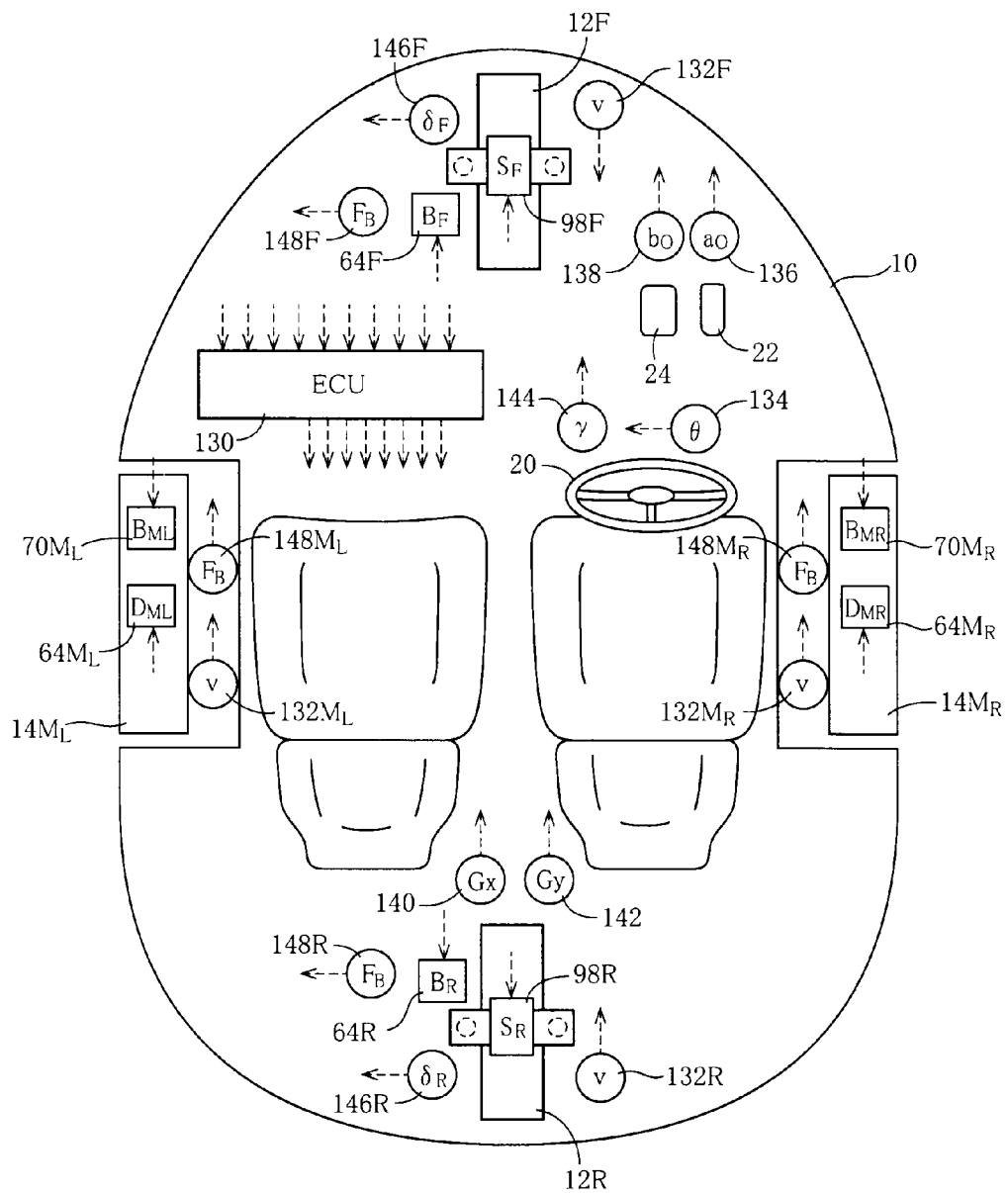
FIG. 2 is a view conceptually showing the vehicle of FIG. 1 and also an overall construction of the vehicle motion control system installed on the vehicle.

The motion of the present vehicle is controlled by the vehicle motion control system having a construction, the entirety of which is shown in FIG. 2. This system has an electronic control unit (hereinafter abbreviated as "ECU") 130 as a controlling device that serves as a core of the system. The ECU 130 is a device constituted principally by a computer, and is configured to control motion of the vehicle, by controlling a right-wheel driving device $[D_{MR}]$ $64M_R$, a left-wheel driving device $[D_{ML}]$ $64M_L$, a right-wheel braking deice $[B_{MR}]$ $70M_R$, a left-wheel braking device $[B_{ML}]$ $70M_L$, a front-wheel steering device $[S_F]$ 98F, a rear-wheel steering device $[S_R]$ 98R, a front-wheel braking device $[B_F]$ 114F and a rear-wheel braking device $[B_R]$ 114R. The ECU 130 has a driver circuit for controlling activations of electromagnetic motors of the respective devices.

The present vehicle motion control system has various sensors as devices for obtaining parameters for controls. Specifically described, the vehicle body is provided with: four wheel-velocity sensors [v] 132 for detecting velocities v of the respective four wheels 12, 14; a steering sensor [θ] for detecting an operating angle θ of the steering wheel 20; an accelerator pedal sensor $[a_O]$ 136 for detecting an operating amount $a_O$ of the accelerator pedal 22; a brake pedal sensor $[b_O]$ 138 for detecting an operating amount $b_O$ of the brake pedal 24; a longitudinal acceleration sensor [Gx] 140 for detecting a longitudinal acceleration Gx of the vehicle body; a lateral acceleration sensor [Gy] 142 for detecting a lateral acceleration Gy of the vehicle body; a yaw rate sensor [γ] 144 for detecting a yaw rate γ of the vehicle; a front-wheel turning angle sensor $[δ_F]$ 146F for detecting a front-wheel turning angle $δ_F$ as an amount of turning of the front wheel 12F; a rear-wheel turning angle sensor $[δ_R]$ 146R for detecting a rear-wheel turning angle $δ_R$ as an amount of turning of the rear wheel 12R; and four braking-force sensors $[F_B]$ 148 for detecting braking forces applied to the respective four wheels 12, 14, based on electric currents flowing through electromagnetic motors of the four braking devices 70, 114 and the two driving devices 64. These sensors are connected to the ECU 130. It is noted that the lateral acceleration sensor [Gy] 142 is provided for detecting the lateral acceleration Gy that is actually exerted on the vehicle body, and that the lateral acceleration Gy actually exerted on the vehicle body is regarded as a lateral acceleration actually exerted on the vehicle in the controls executed in the present vehicle motion control system, for controlling motion of the vehicle. The lateral acceleration Gy actually exerted on the vehicle body and the lateral acceleration actually exerted on the vehicle act in directions opposite to each other.

<Content of Vehicle Motion Control> a) Acceleration/Deceleration Control i) Determination of Driving Force

As a vehicle motion control, an acceleration/deceleration control for accelerating and decelerating the vehicle is executed as follows: When the vehicle is to be accelerated, the accelerator pedal 22 is operated by a vehicle operator, for causing a driving force based on an operating amount of the accelerator pedal 22 to be generated in the vehicle. Specifically described, a driving force $F_{D-MR}*$ and a driving force $F_{D-ML}*$, which are to be applied to the respective right and left wheels $14M_R$, $14M_L$, respectively, are determined in accordance with expression (1) given below, based on the operating amount $a_O$ of the accelerator pedal 22 which is detected by the accelerator pedal sensor 136. It is noted that, in the expression (1), "$K_D$" represents a driving force gain used to determine the driving forces $F_{D-MR}*$, $F_{D-ML}*$. The driving-force gain $K_D$ may be either a constant value or a variable value that varies depending on a parameter.

$$F_{D-ML}*=F_{D-MR}*=K_D \cdot a_O \qquad (1)$$

ii) Determination of Braking Force

When the vehicle is to be decelerated, the brake pedal 24 is operated by the vehicle operator, for causing a braking force based on an operating amount of the brake pedal 24 to be generated in the vehicle. Specifically described, a braking force $F_{B-F}*$, a braking force $F_{R-MR}*$, a braking force $F_{B-ML}*$ and a braking force $F_{B-R}*$, which are to be applied to the respective four wheels 12F, $14M_R$, $14M_L$, 12R, respectively, are determined in accordance with expressions (2)-(5) given below, based on the operating amount $b_O$ of the brake pedal 24 which is detected by the brake pedal sensor 138.

$$F_{B-F}*=K_{B-F} \cdot b_O \qquad (2)$$

$$F_{B-ML}*=K_{B-ML} \cdot b_O \qquad (3)$$

$$F_{B-MR}*=K_{B-MR} \cdot b_O \qquad (4)$$

$$F_{B-R}*=K_{B-R} \cdot b_O \qquad (5)$$

In the above expressions (2)-(5), "$K_B$" represents a braking force gain used to determine each of the braking forces $F_{B-F}*$, $F_{B-ML}*$, $F_{B-MR}*$, $F_{B-R}*$. The braking force gain is dependent on a ratio of distribution of the total braking force (which is to be applied to the vehicle) among the four wheels 12, 14, and can be considered as a braking-force distribution ratio. The braking force gain is determined, normally, based on a load acting on a corresponding one of the four wheels 12, 14 during a stationary state of the vehicle. In the present system, the braking force gain can be changed, in other words, the braking-force distribution ratio can be changed, as described later in detail.

iii) Determination of Target Driving/Braking Force

To each of the front wheel 12F and rear wheel 12R, only the braking force is applied as described above. Thus, the braking forces $F_{B-F}*$, $F_{B-R}*$, which are determined as described above, are target braking forces. Therefore, the braking devices 114F, 114R are determined based on the front-wheel target braking force $F_{B-F}*$ and rear-wheel target braking force $F_{B-R}*$, such that the target braking forces $F_{B-F}*$, $F_{B-R}*$ are applied to the front and rear wheels 12F, 12R. Described in detail, the electric currents based on the target braking forces $F_{B-F}*$, $F_{B-R}*$ are supplied from a battery to the electromagnetic motors of the braking devices 114F, 114R.

On the other hand, to each of the right and left wheels $14M_R$, $14M_L$, both of the driving force $F_D$ and the braking force $F_B$ are applied. In the acceleration/deceleration control, the driving force $F_D$ and the braking force $F_B$ are unified with each other, so as to be handled as a driving/braking force F. That is, a left-wheel target driving/braking force $F_{ML}^*$ and a right-wheel target driving/braking force $F_{MR}^*$ are determined in accordance with expressions (6), (7) given below, based on the driving forces $F_{D-ML}^*$, $F_{D-MR}^*$ and braking force $F_{B-ML}^*$, $F_{B-MR}^*$ which are to be applied to the left and right wheels 14 and which are determined as described above.

$$F_{ML}^* = F_{D-ML}^* - F_{B-ML}^* \qquad (6)$$

$$F_{MR}^* = F_{D-MR}^* - F_{B-MR}^* \qquad (7)$$

When the driving/braking force F* is larger than 0, the driving force is applied to the vehicle. When the driving/braking force F* is smaller than 0, the braking force is applied to the vehicle.

After the above-described left-wheel target driving/braking force $F_{ML}^*$ and right-wheel target driving/braking force $F_{MR}^*$ have been determined, the driving devices 64M$_L$, 64M$_R$ and the braking devices 70M$_L$, 70M$_R$ are controlled such that the driving/braking forces $F_{ML}^*$, $F_{MR}^*$ can be obtained. Described in detail, when the left-wheel target driving/braking force $F_{ML}^* > 0$, an electric current, whose amount corresponds to the left-wheel target driving/braking force $F_{ML}^*$, is supplied from the battery to an electromagnetic motor of the left-wheel driving device 64M$_L$. On the other hand, when the left-wheel target driving/braking force $F_{ML}^* < 0$, an electric current supplied to each of the electromagnetic motors of the left-wheel driving device 64M$_L$ and the left-wheel braking device 70M$_L$ is controlled as follows: Since the driving device 64 functions also as the regenerative braking device, as described above, when the left-wheel target driving/braking force $F_{ML}^*$ (that is a braking force in case that the left-wheel target driving/braking force $F_{ML}^* < 0$) can be covered by a regenerative braking force, the left-wheel driving device 64M$_L$ is controlled such that an electric current is supplied to the electromagnetic motor of the left-wheel driving device 64M$_L$ by an amount that corresponds to the left-wheel target driving/braking force $F_{ML}^*$, and the electric current generated by the electromagnetic motor is collected by the battery. When the left-wheel target driving/braking force $F_{ML}^*$ cannot be covered by the regenerative braking force, the left-wheel driving device 64M$_L$ is controlled such that the regenerative braking force can be obtained by a magnitude maximized at that point of time, and an electric current, whose amount corresponds to the deficiency (i.e. an amount that can not be covered by the regenerative braking force), is supplied from the battery to the electromagnetic motor of the left-wheel braking device 70M$_L$, for obtaining the amount that cannot be covered by the regenerative braking force. It is noted that the right-wheel target driving/braking force $F_{MR}^*$ can be obtained in the same manner as the left-wheel target driving/braking force $F_{ML}^*$, and that the manner for obtaining the right-wheel target driving/braking force $F_{MR}^*$ will not be described.

Although being described later in detail, the above-described left-wheel driving/braking force $F_{ML}^*$ and right-wheel driving/braking force $F_{MR}^*$ are corrected in accordance with expressions (8), (9) given below, based on a right/left wheel driving/braking force difference ΔF that is required in a turning control.

$$F_{ML}^* = F_{ML}^* + \Delta F/2 \qquad (8)$$

$$F_{MR}^* = F_{MR}^* + \Delta F/2 \qquad (9)$$

Therefore, upon turning of the vehicle, the driving devices 64M$_L$, 64M$_R$ and the braking devices 70M$_L$, 70M$_R$ are controlled based on the corrected left-wheel target driving/braking force $F_{ML}^*$ and right-wheel target driving/braking force $F_{MR}^*$.

iv) Anti-Lock Control

In the present vehicle motion control, an anti-lock control is executed for each of the wheels 12, 14. That is, a so-called ABS is installed on the present vehicle. The anti-lock control is a known technique, and will be briefly described. In the anti-lock control, which is executed for preventing locking of each of the wheels 12, 14 that could be caused when a slip ratio of a tire of the wheel becomes one, the electromagnetic motor of a corresponding one of the braking devices 70, 114 is controlled for enabling the braking force (that is to be applied to the wheel) to be held in the vicinity of a suitable magnitude. Specifically described, the slip ratio ρ of each of the wheels 12, 14 is calculated in accordance with expression (10) given below, based on a running velocity V of the vehicle and a wheel velocity v that is detected by a wheel velocity sensor 132.

$$\rho = (V - v)/V \qquad (10)$$

Then, the braking force, which is applied to each wheel, is held in the vicinity of a suitable magnitude, by controlling the electromagnetic motor of a corresponding one of the braking devices 70, 114, based on the slip ratio ρ and an acceleration or deceleration of the wheel which is obtained from the wheel velocity v.

The above-described running velocity V of the vehicle is calculated in accordance with expression (11) given below, based on a vehicle-body longitudinal velocity Vx (that is a velocity of the vehicle as measured in a longitudinal direction of the vehicle) and a vehicle-body lateral velocity Vy (that is a velocity of the vehicle as measured in a width direction of the vehicle).

$$V = \sqrt{(Vx^2 + Vy^2)} \qquad (11)$$

The vehicle-body longitudinal velocity Vx is calculated based on a value detected by the longitudinal acceleration sensor 140. The vehicle-body lateral velocity Vy is estimated in accordance with expression (12) given below (i.e., in accordance with a known technique).

$$Vy = \int (\gamma \cdot Vx - Gy) dt \qquad (12)$$

"γ" represents a yaw rate (actual yaw rate) which is actually established on the vehicle and which is obtained based on a value detected by the yaw rate sensor 144. "Gy" represents a lateral acceleration (actual lateral acceleration) which is actually exerted on the vehicle and which is obtained based on a value detected by the lateral acceleration sensor 140.

b) Turning Control

In the present vehicle motion control system, a front-wheel turning-amount control, a rear-wheel turning-amount control and a right/left wheel driving/braking force difference control are executed when the vehicle is to be turned. The front-wheel turning-amount control and the rear-wheel turning-amount control are executed by determining a target value of a front-wheel turning angle $\delta_F$ as a turning angle of the front wheel 12F and a target value of a rear-wheel turning angle $\delta_R$ as a turning angle of the rear wheel 12R, respectively. The right/left wheel driving/braking force difference control is executed by determining a difference ΔF between the right-wheel target driving/braking force $F_{MR}^*$ and the left-wheel target driving/braking force $F_{ML}^*$ which are to be applied to the respective right and left wheels 14M$_R$, 14M$_L$.

i) Front-Wheel Turning-Amount Control

The turning angle $\delta_F$ of the front wheel 12F is controlled based on an operating angle θ as an operating amount of the steering wheel 20. A target lateral acceleration Gy*, which is a lateral acceleration Gy that is to be exerted on the vehicle upon turning of the vehicle, is determined in accordance with expression (13) given below, based on an operating angle θ detected by the steering sensor 134. That is, the target lateral acceleration Gy* is set to an amount dependent on the above-described operating angle θ. "$K_G$" is a lateral acceleration gain, based on which the target lateral acceleration Gy* is to be determined. The lateral acceleration gain $K_G$ may be either a constant value or a variable value that is variable depending in a certain parameter.

$$Gy^* = K_G \cdot \theta \tag{13}$$

A lateral acceleration (actual lateral acceleration) Gy, which is actually exerted on the vehicle, is obtained based on a value detected by the lateral acceleration sensor 140. Then, a lateral acceleration deviation ΔGy, which is a deviation of the actual lateral acceleration Gy from the target lateral acceleration Gy*, is recognized in accordance with expression (14) given below.

$$\Delta Gy = Gy^* - Gy \tag{14}$$

Then, a target front-wheel turning angle $\delta_F^*$, which is a target value of the front-wheel turning angle δF, is determined in accordance with a feedback control rule based on the above-described lateral acceleration deviation ΔGy. Described in detail, the target front-wheel turning angle $\delta_F^*$ is determined in accordance with expression (15) based on a PID control rule.

$$\delta_F^* = P_F \cdot \Delta Gy + I_F \cdot \int \Delta Gy \cdot dt + D_F \cdot d\Delta Gy/dt \tag{15}$$

The first, second and third terms of the right side of the above expression (15) are a proportional term (P term), an integral term (I term) and a derivative term (D term), respectively. "$P_F$", "$I_F$" and "$D_F$" are a proportional gain, an integral gain and a derivative gain, respectively, for determining the target front-wheel turning angle $\delta_F^*$. Each of the gains $P_F$, $I_F$, $D_F$ may be either a constant value or a variable value that is variable depending in a certain parameter. After the target front-wheel turning angle $\delta_F^*$ has been determined, an amount of the electric current, which is to be supplied to the electromagnetic motor of the front-wheel steering device 98F for causing the actual front-wheel turning angle $\delta_F$ (detected by the front-wheel turning angle sensor 146F) to become equal to the target front-wheel turning angle $\delta_F^*$, is determined, and then the electric current is supplied to the electromagnetic motor by the determined amount.

ii) Right/Left Wheel Driving/Braking Force Difference Control

The right/left wheel driving/braking force difference control, which is for establishing the right/left wheel driving/braking force difference ΔF between the driving/braking force $F_{MR}^*$ applied to the right wheel $14M_R$ and the driving/braking force $F_{ML}^*$ applied to the left wheel $14M_L$, is executed based on the operating angle θ as the operating amount of the steering wheel 20 and the running velocity V of the vehicle. A target yaw rate γ*, which is the yaw rate that is to be established on the vehicle upon turning of the vehicle, is determined in accordance with expression (16) given below, based on the operating angle θ detected by the steering sensor 134 and the running velocity V (=√(Vx²+Vy²)) obtained as described above. That is, the target yaw rate γ* is set to a value dependent on a product of the operating angle θ and the running velocity V. "Kγ" is a yaw rate gain for determining target yaw rate γ*, and may be either a constant value or a variable value that is variable depending in a certain parameter.

$$\gamma^* = K\gamma \cdot \theta \cdot V \tag{16}$$

The yaw rate (actual yaw rate), which is actually established on the vehicle, is obtained based on a value detected by the yaw rate sensor 142. A yaw rate deviation Δγ, which is a deviation of the actual yaw rate from the target yaw rate, is recognized in accordance with expression (17) given below.

$$\Delta\gamma = \gamma^* - \gamma \tag{17}$$

Then, the right/left wheel driving/braking force difference ΔF, which is to be established, is determined in accordance with a feedback control rule based on the above-described yaw rate deviation Δγ. Described in detail, a suitable right/left wheel driving/braking force difference ΔF is determined in accordance with expression (18) based on the PID control rule.

$$\Delta F = P_{LR} \cdot \Delta\gamma + I_{LR} \cdot \int \Delta\gamma \cdot dt + D_{LR} \cdot d\Delta\gamma/dt \tag{18}$$

The first, second and third terms of the right side of the above expression (18) are a proportional term (P term), an integral term (I term) and a derivative term (D term), respectively. "$P_{LR}$", "$I_{LR}$" and "$D_{LR}$" are a proportional gain, an integral gain and a derivative gain, respectively, for determining the above-described right/left wheel driving/braking force difference ΔF. Each of the gains $P_{LR}$, $I_{LR}$ and $D_{LR}$ may be either a constant value or a variable value that is variable depending in a certain parameter. After the right/left wheel driving/braking force difference ΔF has been determined, the left-wheel driving/braking force $F_{ML}^*$ and right-wheel driving/braking force $F_{MR}^*$ are corrected based on the determined right/left wheel driving/braking force difference ΔF, as described above.

iii) Rear-Wheel Turning-Amount Control

The turning angle $\delta_R$ of the rear wheel 12R is controlled based on the lateral acceleration deviation ΔGy recognized in the front-wheel turning-amount control and also the yaw rate deviation Δγ recognized in the right/left wheel driving/braking force difference control. A revolution centripetal acceleration deviation ΔGo is determined in accordance with expression (19) given below, based on the lateral acceleration deviation ΔGy and the yaw rate deviation Δγ.

$$\Delta Go = \Delta Gy \cdot V \cdot \Delta\gamma \tag{19}$$

This revolution centripetal acceleration deviation ΔGo can be considered as an equivalent to a deviation of an actual revolution centripetal acceleration from a target revolution centripetal acceleration Go*. The target revolution centripetal acceleration Go* and the actual revolution centripetal acceleration Go can be represented by respective expressions (20), (21) given below.

$$Go^* = Gy^* \cdot V \cdot \gamma^* \tag{20}$$

$$Go = Gy \cdot V \cdot \gamma \tag{21}$$

Then, a target rear-wheel turning angle $\delta_R^*$ as a target value of the rear-wheel turning angle $\delta_R$ is determined in accordance with a feedback control rule based on the above-described revolution centripetal acceleration deviation ΔGo. Described in detail, the target rear-wheel turning angle $\delta_R^*$ is determined in accordance with expression (22) based on a PID control rule.

$$\delta_R^* = P_R \cdot \Delta G_O + I_R \cdot \int \Delta G_O \cdot dt + D_R \cdot d\Delta G_O/dt \tag{22}$$

The first, second and third terms of the right side of the above expression (22) are a proportional term (P term), an integral term (I term) and a derivative term (D term), respectively. "$P_R$", "$I_R$" and "$D_R$" are a proportional gain, an integral gain and a derivative gain, respectively, for determining the target rear-wheel turning angle $\delta_R{}^*$. Each of the gains $P_R$, $I_R$ and $D_R$ may be either a constant value or a variable value that is variable depending in a certain parameter. After the target rear-wheel turning angle $\delta_R{}^*$ has been determined, an amount of the electric current, which is to be supplied to the electromagnetic motor of the rear-wheel steering device 98R for causing the actual rear-wheel turning angle $\delta_R$ (detected by the rear-wheel turning angle sensor 146R) to become equal to the target rear-wheel turning angle $\delta_R{}^*$, is determined, and then the electric current is supplied to the electromagnetic motor by the determined amount. It is noted that, in place of the above-described control method, the amount of the electric current, which is to be supplied to the electromagnetic motor, may be determined directly based on the above expression (22), so that the electric current is controlled to be supplied to the electromagnetic motor by the determined amount.

c) Slip Managing Control
i) Outline of Slip Managing Control

In the present vehicle motion control system, a slip managing control is executed for managing a change of a heading direction of the vehicle, which is induced due to slip of at least one of the left wheel 14M$_L$ and the right wheel 14M$_R$. The "slip" means that a magnitude of force applied to the at least one of the wheels reaches neighborhood of limit of a friction force generated between the at least one of the wheels and a road surface. The slip managing control is a control that is executed when the vehicle is to be braked in a direction-change situation that there is a change of a heading direction of the vehicle toward a particular direction (i.e., clockwise direction or counterclockwise direction as seen from an upper side of the vehicle) due to the slip and/or when the vehicle is to be braked in a direction-change risk situation that there is a risk of the change of the heading direction of the vehicle toward the particular direction.

The direction-change situation (that the heading direction of the vehicle is being changed toward the particular direction due to the slip) includes, for example, a situation that spin or drift-out of the vehicle take places when the lateral force reaches the friction force since at least one of the right and left wheels 14 passes on concavity and convexity of a road surface or a low friction-coefficient portion of the road surface during rapid or abrupt turning of the vehicle, and a situation that rotation of the vehicle takes place upon braking of the vehicle during running of the vehicle on a road surface with right and left wheels 14M$_R$, 14M$_L$ passing on respective portions of the road surface having respective friction coefficients that are different from each other by a large amount, wherein the rotation of the vehicle is caused by a difference between the braking force applied to the right wheel 14M$_R$ and the braking force applied to the left wheel 14M$_L$ when the braking force applied to one of the right and left wheels 14M$_R$, 14M$_L$ which passes on the lower friction portion of the road surface reaches the limit of the friction force. The direction-change risk situation (that there is a risk of the change of the heading direction of the vehicle toward the particular direction) includes a situation that the vehicle is running on a so-called crossover road, i.e., on the road surface with the right and left wheels 14M$_R$, 14M$_L$ passing on respective portions of the road surface having respective friction coefficients that are different from each other by a large amount.

Figure 5:
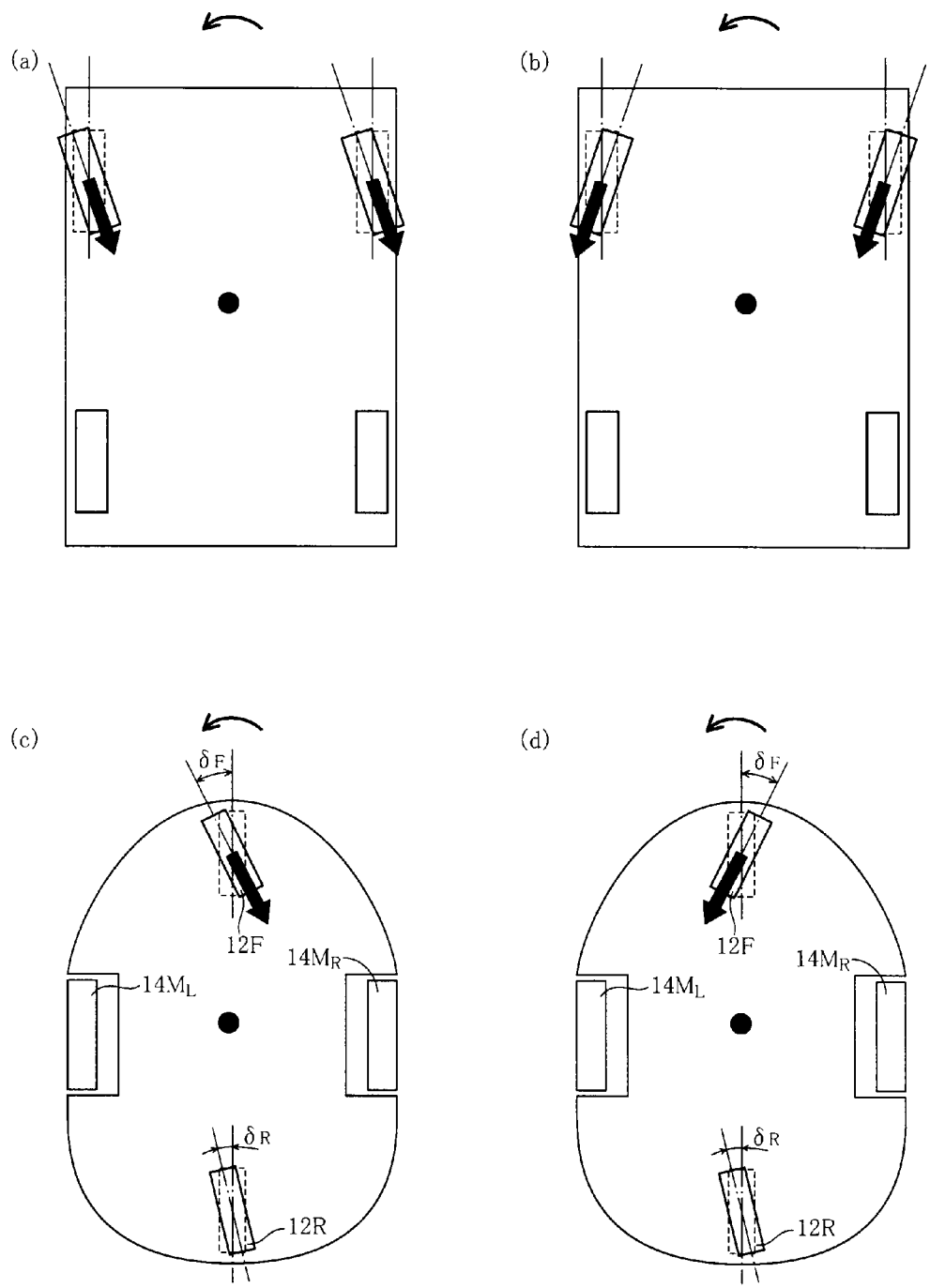
FIG. 5a-d is a set of views for comparing a vehicle (diamond-shaped wheel-arrangement vehicle) on which the vehicle motion control system according to the embodiment of the invention is installed, with a four-corners wheel-arrangement vehicle, when the vehicle is to be braked in a situation that a heading direction of the vehicle is being changed toward a particular direction.

There will be described, as the direction-change situation (that the heading direction of the vehicle is being changed toward the particular direction due to the slip), a situation that spin of the vehicle take places, by comparing a case of spinning of the present vehicle with a case of spinning of an ordinary vehicle (hereinafter referred to as "four-corners wheel-arrangement vehicle" where appropriate) having front right and left wheels as two front wheels and rear right and left wheels as two rear wheels. FIG. 5 is a set of view showing cases where a spin moment acts in counterclockwise direction in the four-corners wheel-arrangement vehicle and in the present vehicle. FIG. 5 (a) shows a situation that each of the front wheels as the steerable wheels is turned counterclockwise from its neutral position in the four-corners wheel-arrangement vehicle. FIG. 5 (b) shows a situation that each of the front wheels as the steerable wheels is turned clockwise from its neutral position in the four-corners wheel-arrangement vehicle. FIG. 5 (c) shows a situation that the front wheel 12F is turned counterclockwise from its neutral position in the present vehicle. FIG. 5 (d) shows a situation that the front wheel 12F is turned clockwise from its neutral position in the present vehicle.

Upon braking of the four-corners wheel-arrangement vehicle, a clockwise moment is generated by the braking force applied to the front right wheel irrespective of a turning direction of the front right wheel, and a counterclockwise moment is generated by the braking force applied to the front left wheel irrespective of a turning direction of the front left wheel, as shown in (a), (b) of FIG. 5. That is, in the four-corners wheel-arrangement vehicle, the spin moment acting in the counterclockwise direction can be suppressed, by controlling the braking forces such that the braking force applied to the front right wheel is increased while the braking force applied to the front left wheel is reduced. On the other hand, upon braking of the present vehicle as a diamond-shaped wheel-arrangement vehicle, a clockwise moment is generated by the braking force applied to the front wheel 12F when the front wheel 12F is turned in the counterclockwise direction, as shown in (c) of FIG. 5, and a counterclockwise moment is generated by the braking force applied to the front wheel 12F when the front wheel 12F is turned in the clockwise direction, as shown in (d) of FIG. 5. That is, in the present vehicle, it is necessary to consider also the direction of turning of the front wheel 12F, for suppressing the spin moment by the braking force applied to the front wheel 12F.

In the motion control system of the present vehicle, the slip managing control is executed for managing the slip-induced vehicle-direction change, by mainly executing a control for causing a magnitude of the braking force applied to the front wheel 12F, to vary depending on the direction of turning of the front wheel 12F, even without a change in the operation being applied to the brake operating member Further, in the slip managing control, the braking force applied to the rear wheel 12R is also controlled by taking account of the direction of turning of the front wheel 12F. Still further, in the slip managing control, the turning of the rear wheel 12R and the braking forces applied to the right and left wheels 14 are also controlled for managing the slip-induced vehicle-direction change. The slip managing control will be described in detail.

ii) Slip Judgment

In the present vehicle motion control system, in the ECU 130, it is judged whether the vehicle is in the direction-change situation or not and whether the vehicle is in the direction-change risk situation or not, and the slip managing control is executed when the vehicle is in the direction-change situation or in the direction-change risk situation.

According to a first manner of the judgment, when the vehicle is running on a so-called crossover road, i.e., on a road surface with the right and left wheels 14M$_R$, 14M$_L$ passing on respective portions of the road surface having respective friction coefficients $\mu_R$, $\mu_L$, that are different from each other by an amount exceeding a given amount, it is judged that the vehicle is in the direction-change risk situation (that there is a risk of the change of the heading direction of the vehicle toward the particular direction), because a magnitude of force applied to one of the right and left wheels $14M_R$, $14M_L$ could reach a limit of a friction force generated between the road surface and the one of the right and left wheels $14M_R$, $14M_L$. It is noted that the friction coefficient of each of the portions of the road surface, on which the respective wheels 12, 14 passes, is estimated in accordance with a known technique (as disclosed in JP-S63-116932A and JP-S63-207762A), and that detailed description of the technique will not be provided herein.

Figure 6:
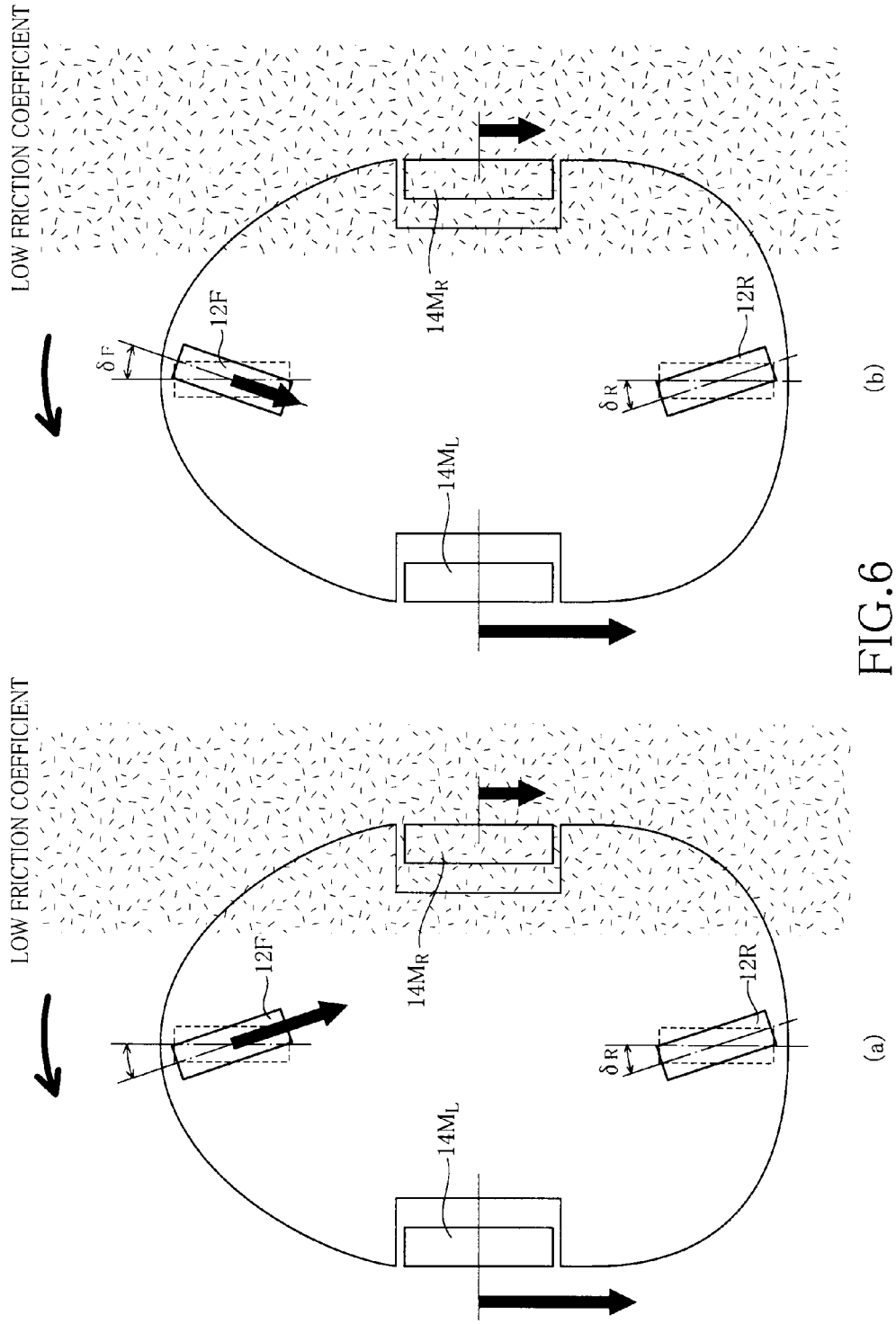
FIG. 6a-b is a set of views of showing a situation that the vehicle (on which the vehicle motion control system according to the embodiment of the invention is installed) is running on a crossover road, and indicating a magnitude of a braking force applied to the front wheel, which is changed depending on a turning direction of the front wheel in a slip managing control.

There will be described a case where the vehicle is to be braked during running of the vehicle on a crossover road as shown in FIG. 6. In such a case, since a maximum magnitude of the friction force generated between the road surface and one (hereinafter referred to as "low-friction-coefficient-side wheel" where appropriate) of the right and left wheels $14M_R$, $14M_L$, which passes on a portion having a low friction coefficient, is smaller than a maximum magnitude of the friction force generated between the road surface and the other (hereinafter referred to as "high-friction-coefficient-side wheel" where appropriate) of the right and left wheels $14M_R$, $14M_L$, which passes on a portion having a high friction coefficient, the braking force applied to the low-friction-coefficient-side wheel reaches its limit earlier than the braking force applied to the high-friction-coefficient-side wheel. In FIG. 6, the right wheel $14M_R$ corresponds to the low-friction-coefficient-side wheel while the left wheel $14M_L$ corresponds to the high-friction-coefficient-side wheel. It is noted that, in the present vehicle, the magnitude of the braking force applied to the low-friction-coefficient-side wheel is held in the vicinity of the maximum magnitude, owing to activation of the ABS as described above. That is, when the vehicle is to be braked on the crossover road, there is caused a difference between the magnitude of the braking force applied to the right wheel $14M_R$ and the magnitude of the braking force applied to the left wheel $14M_L$, so that the heading direction of the vehicle is changed by the difference with respect to the magnitude of the braking force. Therefore, in the present vehicle motion control system, during running of the vehicle on a crossover road, the slip managing control is executed. In the following description, this first manner of the judgment will be referred to as "road-surface-condition-based slip judgment", where appropriate.

Since the four wheels 12, 14 are arranged in a diamond-shaped arrangement in the present vehicle, there is a possibility that three wheels, i.e., one of the right and left wheels 14 and the front and rear wheels 12 pass on a road surface portion having a low friction coefficient, when the vehicle runs on a crossover road. That is, it is considered that, when being braked during running on a cross road, the diamond-shaped wheel-arrangement vehicle is more easily placed into an unstable state, as compared with the four-corners wheel-arrangement vehicle. In this sense, the slip managing control described below in detail is effective particularly in the diamond-shaped wheel-arrangement vehicle.

According to a second manner of the judgment, the judgment is made about whether or not the vehicle is in the situation of the slip-induced vehicle-direction change. That is, it is judged that the vehicle is in the direction-change situation, when a degree of the change of the heading direction of the vehicle becomes larger than a given degree. Specifically described, a yawing index f ($\beta$) is used as an index indicative of the degree of the change of the heading direction of the vehicle, and is calculated in accordance with expression (23) given below, based on a vehicle-body sideslip angle $\beta$ that is a sideslip angle at a center of gravity of the vehicle body.

$$f(\beta)=K_1 \cdot \Delta\beta+K_2 \cdot d\beta/dt (K_1, K_2: \text{constants}) \quad (23)$$

In the above expression (23), "$\Delta\beta$" of the first term in the right side is a vehicle-body sideslip-angle deviation ($=\beta^*-\beta$) of an actual vehicle-body sideslip angle $\beta$ (as an actual value of the vehicle-body sideslip angle) from a target vehicle-body sideslip angle $\beta^*$ (as a target value of the vehicle-body sideslip angle), while "$d\beta/dt$" of the second term in the right side is a derivative of the actual vehicle-body sideslip angle $\beta$, i.e., an actual vehicle-body sideslip-angle change. The target vehicle-body sideslip angle $\beta^*$ and the actual vehicle-body sideslip angle $\beta$ are expressed by expressions (24), (25) give below.

$$\beta=Vy/Vx \quad (24)$$

$$\beta^*=Vy^*/Vx^* \quad (25)$$

"Vx" and "Vy" of the above expression (24) are obtained as described above. "Vx*" and "Vy*" of the above expression (25) are a target value of the vehicle-body longitudinal velocity and a target value of the vehicle-body lateral velocity, respectively. The target vehicle-body longitudinal velocity Vx* is determined based the actual vehicle-body longitudinal velocity Vx obtained described above and a target longitudinal acceleration Gx* obtained from an operating amount $a_O$ of the accelerator pedal detected by the accelerator pedal sensor 136 and an operating amount $b_O$ of the brake pedal detected by the brake pedal sensor 138. The target vehicle-body lateral velocity Vy* is determined in accordance with expression (26) given below, based on the target vehicle-body longitudinal velocity Vx* and also the target yaw rate $\gamma^*$ and target lateral acceleration Gy* that are determined as described above.

$$Vy^*=\int(\gamma^* \cdot Vx^*-Gy^*)dt \quad (26)$$

Then, when the value calculated by the above expression (23) exceeds a threshold value $f_0$, it is judged that the vehicle is in the situation of the slip-induced vehicle-direction change, so that the slip managing control is executed. In the following description, this second manner of the judgment will be referred to as "vehicle-condition-based slip judgment", where appropriate. It is noted that the yawing index used for the vehicle-condition-based slip judgment does not necessarily have to be determined based on the above-described vehicle-body sideslip-angle deviation and vehicle-body sideslip-angle change, but may be determined based on, for example, a rate of the vehicle-body sideslip-angle change, a value of the actual yaw rate and/or a deviation of the actual yaw rate from the target yaw rate.

iii) Types of Slip Managing Control

Figure 7:
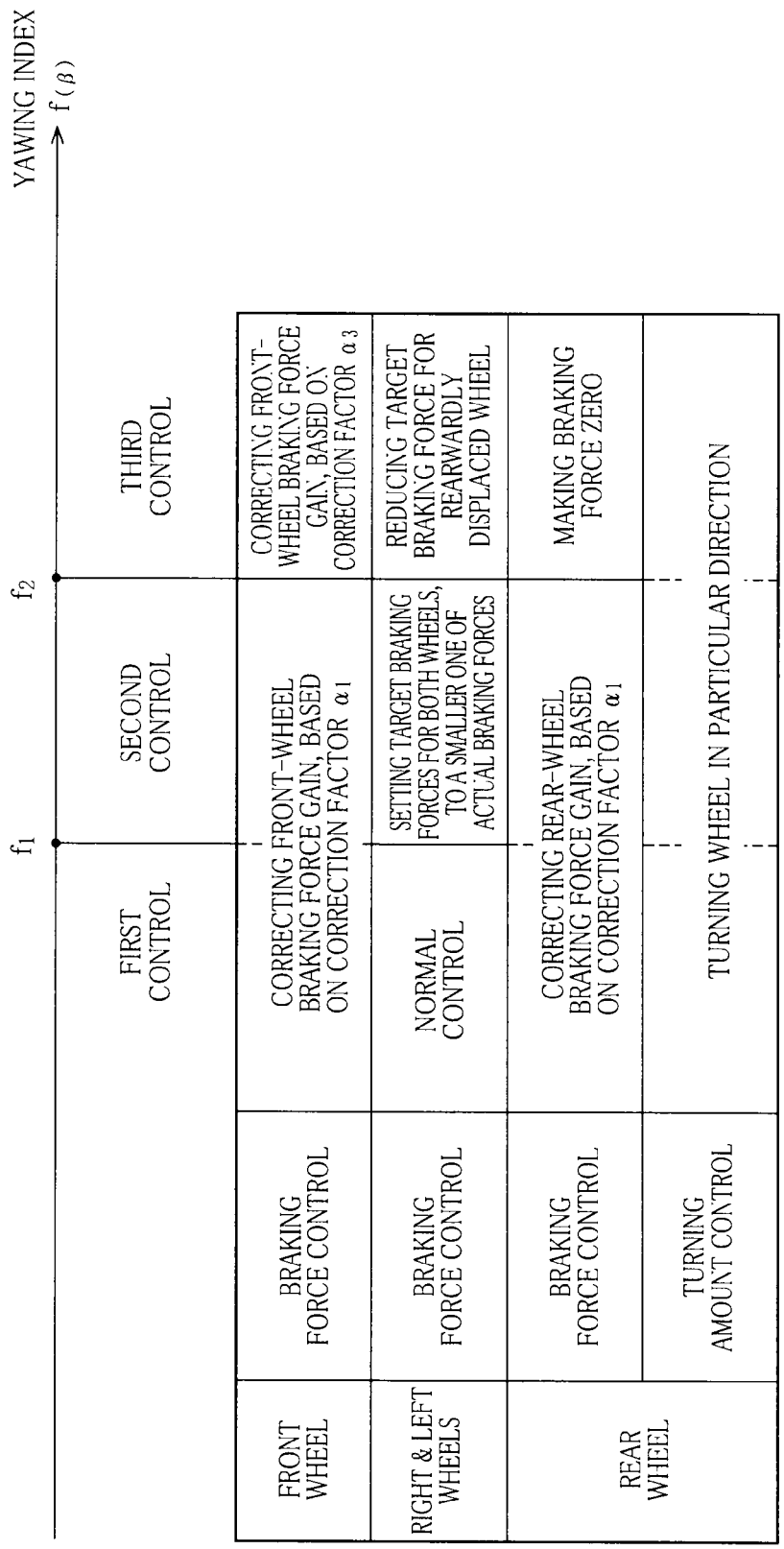
FIG. 7 is a view showing contents of three types of the slip managing control.

In the slip managing control which is executed in the present vehicle motion control system, the braking of the vehicle and the suppression of the slip-induced vehicle-direction change are both regarded important when the degree of the change of the heading direction of the vehicle is small, and the suppression of the slip-induced vehicle-direction change is regarded as more important than the braking of the vehicle as the degree of the change of the heading direction of the vehicle is increased. In this aspect, the slip managing control is classified into three types, i.e., a first control, a second control and a third control. As shown in FIG. 7, the first control is executed when the yawing index f($\beta$) is not larger than a first value $f_1 (>f_0)$, the second control is executed when the yawing index f($\beta$) is larger than the first value $f_1$ and is small then a second value $f_2$, and the third control is executed when the yawing index $f(\beta)$ is not small than the second value $f_2$. Each of the three types of the control is executed by principally controlling the braking force applied to the front wheel 12F by taking account of also the turning direction of the front wheel 12F relative to the particular direction as the direction of the slip-induced vehicle-direction change. As described later in detail, the first, second and third controls are different with one another with respect to the magnitude of the braking force applied to the front wheel 12F, control of the braking force applied to the rear wheel 12R and control of the braking force applied to each of the right and left wheels 14. The suppression of the slip-induced vehicle-direction change is regarded as more important than the braking of the vehicle, as the degree of the change of the heading direction of the vehicle is increased. The three types of the control will be described.

iv) First Control

In the first control, the braking of the vehicle as well as the suppression of the slip-induced vehicle-direction change is regarded as important. As shown in (c) of FIG. 5 and (a) of FIG. 6, when the front wheel 12F is turned in the same direction as the particular direction, the moment generated by the braking force applied to the front wheel 12F is caused to act in a direction opposite to the particular direction, namely, the generated moment acts as an anti-spin moment. On the other hand, as shown in (d) of FIG. 5 and (b) of FIG. 6, when the front wheel 12F is turned in a direction opposite to the particular direction, the moment generated by the braking force applied to the front wheel 12F is caused to act in the same direction as the particular direction, namely, the generated moment acts as a spin moment. In view of this, in all of the types of the slip managing control including the first control, the magnitude of the braking force applied to the front wheel 12F is made larger when the front wheel 12F is turned in the same direction as the particular direction than when the front wheel 12F is turned in the direction opposite to the particular direction. Further, in the first control, the magnitude of the braking force applied to the rear wheel 12R is made smaller when the front wheel 12F is turned in the same direction as the particular direction than when the front wheel 12F is turned in the direction opposite to the particular direction. Further, in the first control, the braking forces applied to the front and rear wheels 12 are controlled such that a sum of the magnitudes of the braking forces applied to the front and rear wheels 12 is held substantially constant as long as a same operation is being applied to the brake operating member.

In the slip managing control, the braking forces applied to the front and rear wheels 12 are controlled by changing the braking force gain $K_{B-F}$ for the front wheel 12F and the braking force gain $K_{B-R}$ for the rear wheel 12R. The braking force gains $K_{B-F}$ and $K_{B-R}$ are corrected in accordance with expression (27), (28) given below.

$$K_{B-F} = \alpha_1 \cdot K_{B-F} \quad (27)$$

$$K_{B-R} = (2-\alpha_1) \cdot K_{B-R} \quad (28)$$

Figure 8:
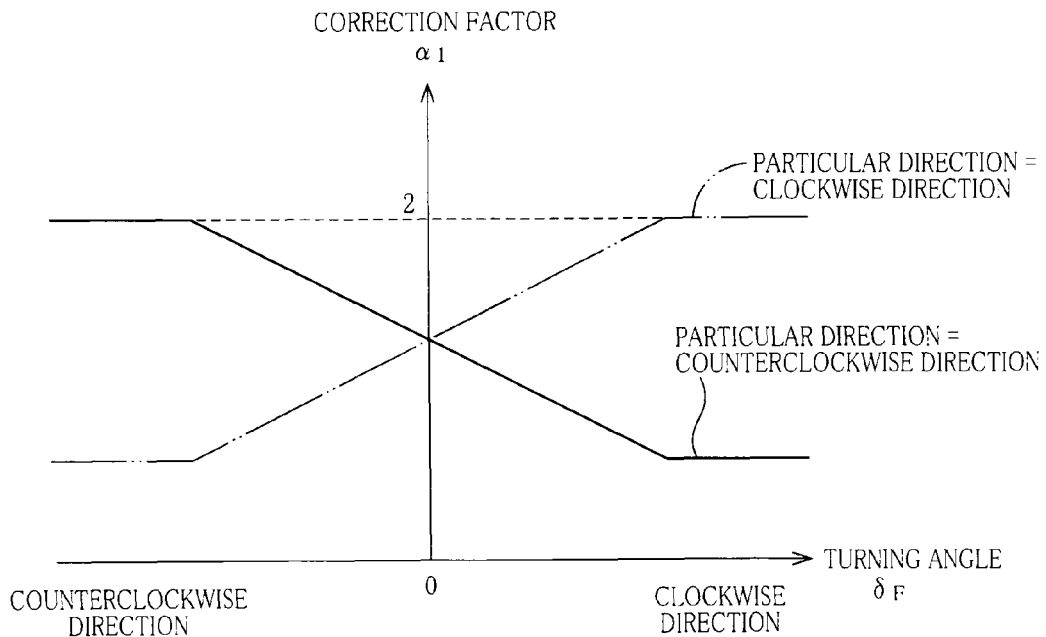
FIG. 8 is a view showing a relationship between a turning angle of the front wheel and a correction factor for correcting braking forces applied to the front and rear wheels in first and second controls of the slip managing control.

In the above expressions (27), (28), "$\alpha_1$" is a correction factor for correcting the braking force gains $K_{B-F}$, $K_{B-R}$. FIG. 8 shows a relationship between the correction factor $\alpha_1$ and the turning angle $\delta_F$ of the front wheel 12F. As is understood from FIG. 8, the front-wheel braking force gain $K_{B-F}$ is increased with an increase of the amount of turning of the front wheel 12F in the same direction as the particular direction, and is reduced with an increase of the amount of turning of the front wheel 12F in a direction opposite to the particular direction. Meanwhile, the rear-wheel braking force gain $K_{B-R}$ is reduced with an increase of the amount of turning of the front wheel 12F in the same direction as the particular direction, and is increased with an increase of the amount of turning of the front wheel 12F in the direction opposite to the particular direction. Thus, the target braking force $F_{B-F}^*$ applied to the front wheel 12F is increased with an increase of the amount of turning of the front wheel 12F in the same direction as the particular direction, and is reduced with an increase of the amount of turning of the front wheel 12F in the direction opposite to the particular direction. Meanwhile, the target braking force $F_{B-R}^*$ applied to the rear wheel 12R is reduced with an increase of the amount of turning of the front wheel 12F in the same direction as the particular direction, and is increased with an increase of the amount of turning of the front wheel 12F in the direction opposite to the particular direction.

Further, when the vehicle is in the situation of the slip-induced vehicle-direction change, the activation of the ABS impedes at least one of the right and left wheels 14 from receiving the target braking force. Therefore, in the first control, for compensating deficiencies of the braking forces applied to the right and left wheels 14, with the braking forces applied to the front and rear wheels 12, the target braking forces $F_{B-F}^*$, $F_{B-R}^*$ applied to the front and rear wheels 12 are corrected. The braking forces $F_{B-ML}$, $F_{B-MR}$ (actual braking forces) actually applied to the left and right wheels 14 are obtained based on values detected by the braking-force sensors 148 provided for the left and right wheels 14. Then, deviations $\Delta F_{B-ML}$, $\Delta F_{B-MR}$ of the actual braking forces $F_{B-ML}$, $F_{B-MR}$ from the target braking force $F_{B-ML}^*$, $F_{B-MR}^*$ are calculated in accordance with expressions (29), (30) given below.

$$\Delta F_{B-ML} = F_{B-ML} - F_{B-ML} \quad (29)$$

$$\Delta F_{B-MR} = F_{B-MR} - F_{B-MR} \quad (30)$$

Then, a sum of the braking force deviations $\Delta F_{B-ML}$, $\Delta F_{B-MR}$ of the left and right wheels 14 is divided into two, one of which is directed to the front wheel 12F and the other of which is directed to the rear wheel 12R such that a proportion between the one directed to the front wheel 12F and the other directed to the rear wheel 12R is $\alpha_1:(2-\alpha_1)$. That is, the target braking forces $F_{B-F}^*$, $F_{B-R}^*$ applied to the front and rear wheels 12 are corrected in accordance with expressions (31), (32) given below.

$$F_{B-F}^* = F_{B-F}^* + (\Delta F_{B-ML} + \Delta F_{B-MR}) \cdot \alpha_1 / 2 \quad (31)$$

$$F_{B-R}^* = F_{B-R}^* + (\Delta F_{B-ML} + \Delta F_{B-MR}) \cdot (2-\alpha_1) / 2 \quad (32)$$

It is noted that the compensation of the deficiencies of the braking forces applied to the left and right wheels 14 with the braking forces applied to the front and rear wheels 12 may be carried out only when it is affordable to generate the braking forces that are applied to the front wheel 12F and the rear wheel 12R. For example, it is possible to estimate a maximum amount of the braking force that can be generated for each of the front and rear wheels 12F, 12R, based on the slip ratio of a corresponding one of the front and rear wheels 12F, 12R and the friction coefficient μ of a portion of the road surface on which the corresponding one of the front and rear wheels 12F, 12R passes, and to judge whether it is affordable to generate the braking forces applied to the front and rear wheels 12.

Next, there will be described control for the turning amount of the rear wheel 12R in the slip managing control including the first control. Regarding the rear wheel 12R, the target turning angle, which has been determined as described above, is corrected such that the rear wheel 12R is turned in the same direction as the particular direction, for suppressing the slip-induced vehicle-direction change. This correction is made in accordance with expression (33) given below, based on the vehicle-body sideslip-angle deviation Δβ and the actual vehicle-body sideslip-angle change dβ/dt that have been used in calculation of the yawing index f(β).

$$\delta_R^* = \delta_R^* + K_3 \cdot \Delta\beta + K_4 \cdot d\beta/dt \text{ (K3, K4: constants)} \quad (33)$$

v) Second Control

In the second control, in addition to the controls of the braking forces applied to the front and rear wheels 12 and the turning amount of the rear wheel 12R that are carried out also in the first control, the braking forces applied to the right and left wheels 14 are controlled for suppressing the slip-induced vehicle-direction change. The controls of the braking forces applied to the right and left wheels 14 are carried out for equalizing the magnitudes of the braking forces applied to the right and left wheels $14M_R$, $14M_L$ to each other, so as to eliminate a moment based on a difference between the magnitudes of the braking forces. Specifically described, the braking forces $F_{B-ML}$, $F_{B-MR}$ (actual braking forces) actually applied to the left and right wheels 14 are obtained based on values detected by the braking-force sensors 148 provided for the left and right wheels 14. Then, each of the target braking force $F_{B-ML}^*$, $F_{B-MR}^*$ is set to the magnitude of a smaller one of the braking forces $F_{B-ML}$, $F_{B-MR}$, for causing the magnitude of a larger one of the braking forces $F_{B-ML}$, $F_{B-MR}$ to be reduced to the magnitude of the smaller one of the braking forces $F_{B-ML}$, $F_{B-MR}$.

vi) Third Control

In third control, the turning amount of the rear wheel 12R is controlled in the same manner as in the first and second controls. However, in the third control, the braking forces applied to the four wheels 12, 14 are controlled in manners different from those in the first and second controls. The braking force applied to the rear wheel 12R is made zero, for avoiding generation of a spin moment based on the braking force applied to the rear wheel 12. The braking force applied to the front wheel 12F is controlled, as in the first and second controls, by changing the braking force gain $K_{B-F}$ for the front wheel 12F. The front-wheel braking force gain $K_{B-F}$ is corrected in accordance with expression (34) given below.

$$K_{B-F} = \alpha_3 \cdot K_{B-F} \quad (34)$$

Figure 9:
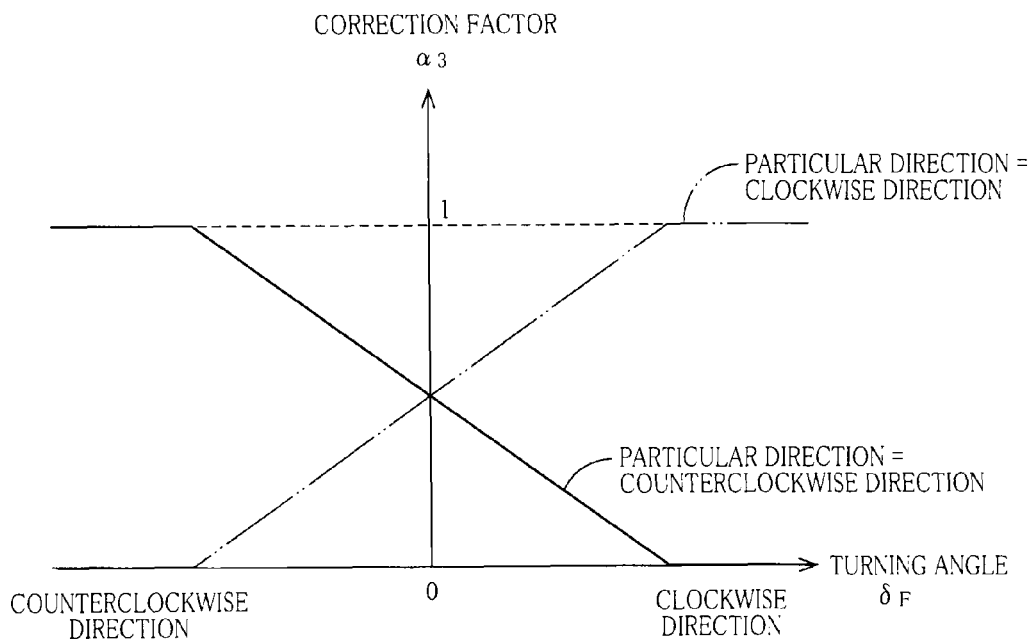
FIG. 9 is a view showing a relationship between the turning angle of the front wheel and a correction factor for correcting the braking force applied to the front wheel in a third control of the slip managing control.

FIG. 9 shows a relationship between the correction factor $\alpha_3$ and the turning angle $\delta_F$ of the front wheel 12F. As is understood from FIG. 9, the front-wheel braking force gain $K_{B-F}$ is increased with an increase of the amount of turning of the front wheel 12F in the same direction as the particular direction, and is reduced with an increase of the amount of turning of the front wheel 12F in a direction opposite to the particular direction. Thus, the target braking force $F_{B-F}^*$ applied to the front wheel 12F is increased with an increase of the amount of turning of the front wheel 12F in the same direction as the particular direction, and is reduced with an increase of the amount of turning of the front wheel 12F in the direction opposite to the particular direction.

The braking forces applied to the right and left wheels $14M_R$, $14M_L$ are controlled such that the braking force applied to one of the right and left wheels $14M_R$, $14M_L$, which is displaced rearwardly relative to the other of the wheels $14M_R$, $14M_L$ upon rotation of the vehicle in the particular direction, is smaller than the braking force applied to the other of the wheels $14M_R$, $14M_L$. That is, when the particular direction is the counterclockwise direction, the braking force applied to the left wheel $14M_L$ is reduced. When the particular direction is the clockwise direction, the braking force applied to the right wheel $14M_R$ is reduced. Specifically described, when the particular direction is the counterclockwise direction, the target braking force $F_{B-ML}^*$ applied to the left wheel $14M_L$ is determined in accordance with expression (35) given below, such that the target braking force $F_{B-ML}^*$ is obtained by subtracting an amount based on the vehicle-body sideslip-angle deviation Δβ and the actual vehicle-body sideslip-angle change dβ/dt, from the actual braking force $F_{B-MR}$ of the right wheel $12M_R$ that has been obtained from a value detected by the braking-force sensor 148. When the particular direction is the clockwise direction, the target braking force $F_{B-MR}^*$ applied to the right wheel $14M_R$ is determined in accordance with expression (36) given below, such that the target braking force $F_{B-MR}^*$ is obtained by subtracting an amount based on the vehicle-body sideslip-angle deviation Δβ and the actual vehicle-body sideslip-angle change dβ/dt, from the actual braking force $F_{B-ML}$ of the left wheel $12M_L$ that has been obtained from a value detected by the braking-force sensor 148.

$$F_{B-ML}^* = F_{B-MR} - (K_5 \cdot \Delta\beta + K_6 \cdot d\beta/dt) \quad (35)$$

$$F_{B-MR}^* = F_{B-ML} - (K_5 \cdot \Delta\beta + K_6 \cdot d\beta/dt) \quad (36)$$

Thus, the controls of the braking forces applied to the right and left wheels 14 are carried out for generating an anti-spin moment based on a difference between the magnitudes of the braking forces applied to the right and left wheels 14.

<Control Programs>

Figure 10:
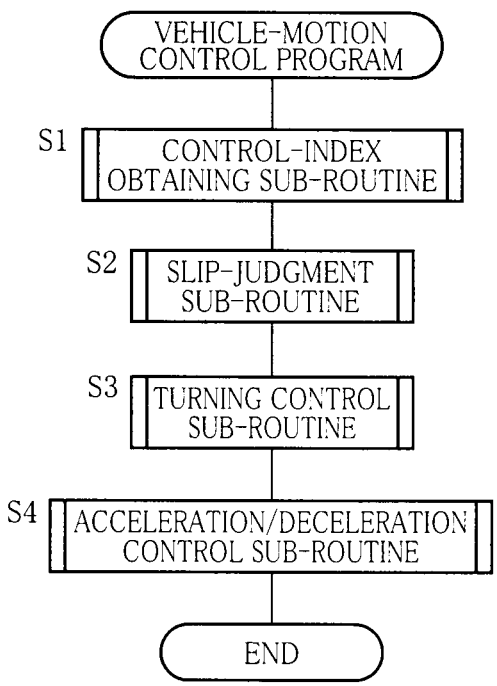
FIG. 10 is a flow chart showing a vehicle-motion control program executed by an electronic control unit shown in FIG. 2.

The motion of the vehicle is controlled by execution of a vehicle-motion control program shown in a flow chart of FIG. 10. The vehicle-motion control program is repeatedly executed by the ECU 130 at a short time interval (e.g., several microseconds to several tens of microseconds) while an ignition switch of the vehicle is placed in its ON state. The vehicle-motion control program will be described with reference to the flow chart of FIG. 10.

The vehicle-motion control program is initiated with step 1 (hereinafter abbreviated as S1 as well as the other steps) that is implemented to carry out procedures for, for example, obtaining and calculating various indexes required for the present vehicle-motion control. Next, in S2, it is judged whether or not the vehicle is in a situation that the slip-induced vehicle-direction change is being induced, and whether or not the vehicle is in a situation that there is a risk of the slip-induced vehicle-direction change. Then, when it is judged that the vehicle is in either one of the above situations, there is carried out a process for determining which one of the three types of the slip managing control is to be executed. In S3, the turning control is executed. In S4, the acceleration/deceleration control is executed.

Figure 11:
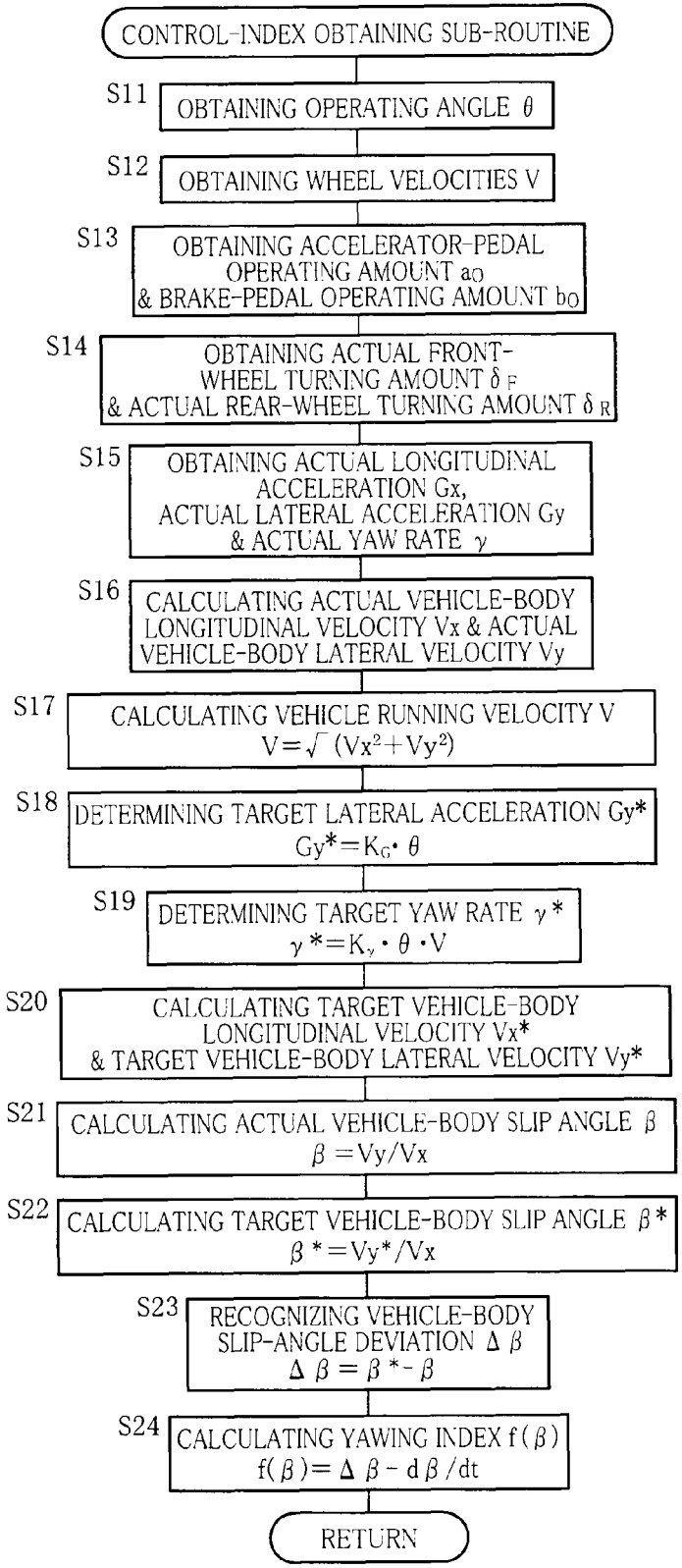
FIG. 11 is a flow chart showing a control-index obtaining sub-routine executed in the vehicle-motion control program of FIG. 10.

S1 is implemented by executing a control-index obtaining sub-routine shown in a flow chart of FIG. 11. In S1, procedures are carried out for obtaining results of detections made by the various sensors and calculating, for example, the running velocity V (that is used for estimating the friction coefficient μ of the road surface in the slip judgment) and the yawing index f(β). Since the procedures carried out in accordance with this sub-routine have been described above in detail, the description thereof will not be provided herein.

Figure 12:
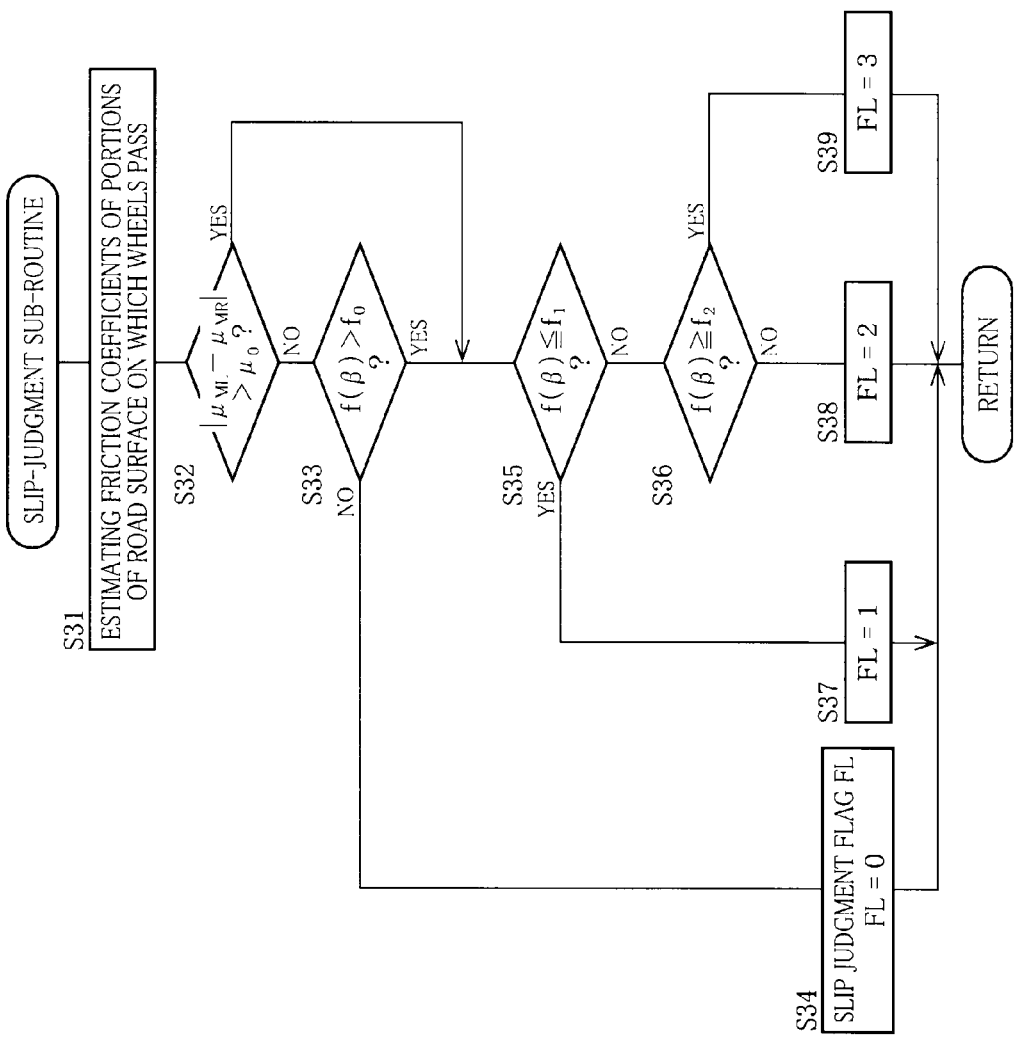
FIG. 12 is a flow chart showing a slip-judgment sub-routine executed in the vehicle-motion control program of FIG. 10.

In the present program, there is used a slip judgment flag FL that is indicative of which one of the above-described controls is to be executed. The flag FL is set to 0 when a normal control is to be executed. The flag FL is set to 1 when the first control of the slip managing control is to be executed. The flag FL is set to 2 when the second control of the slip managing control is to be executed. The flag FL is set to 3 when the third control of the slip managing control is to be executed. The above-described S2 is implemented by executing a slip-judgment sub-routine shown in a flow chart of FIG. 12, whereby a flag value of the slip judgment flag is determined for determining which one of the controls is to be executed.

The slip-judgment sub-routine is initiated with S31 that is implemented to estimate the friction coefficients μ of portions of the road surface (on which the wheels 12, 14 pass), based on the running velocity V and the wheel velocity v. Then, in S32, it is judged whether a difference between the friction coefficients $\mu_{ML}$, $\mu_{MR}$ of the portions of the road surface (on which the left and right wheels 14 pass) exceeds a given value $\mu_0$ or not. In S33, it is judged whether the yawing index f(β) exceeds a threshold value $f_0$. When the difference between the friction coefficients is smaller than the given value $\mu_0$ and the yawing index f(β) is smaller than the threshold value $f_0$, the flag FL is set to 0 for executing the normal control. On the other hand, when the difference of the friction coefficient exceeds the given value $\mu_0$, or when the yawing index f(β) exceeds the threshold value $f_0$, S35 and steps following step S35 are implemented to determine which one of the types of the slip managing control is to be executed. That is, as shown in FIG. 7, the flag FL is set to 1, 2 or 3, depending on the value of the yawing index f(β), for thereby executing one of the first, second and third controls.

Figure 13:
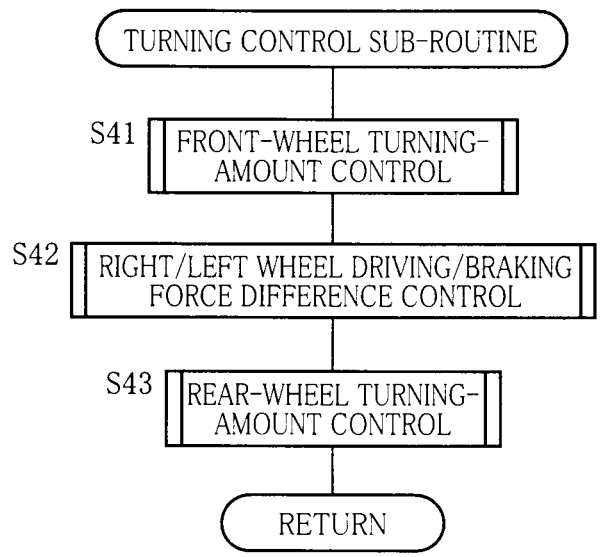
FIG. 13 is a flow chart showing a turning control sub-routine executed in the vehicle-motion control program of FIG. 10.
Figure 14:
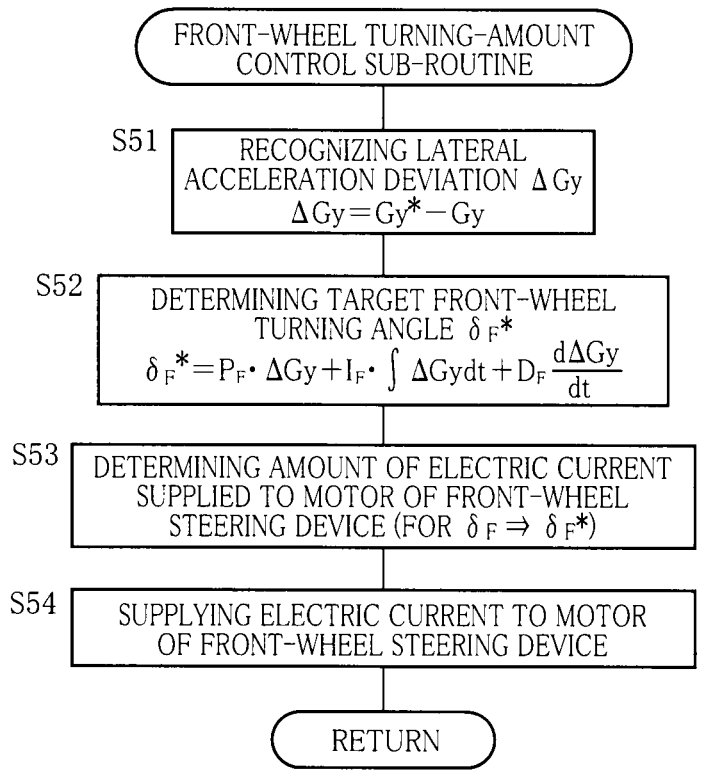
FIG. 14 is a flow chart showing a front-wheel turning-amount control sub-routine executed in the turning control sub-routine of FIG. 13.
Figure 15:
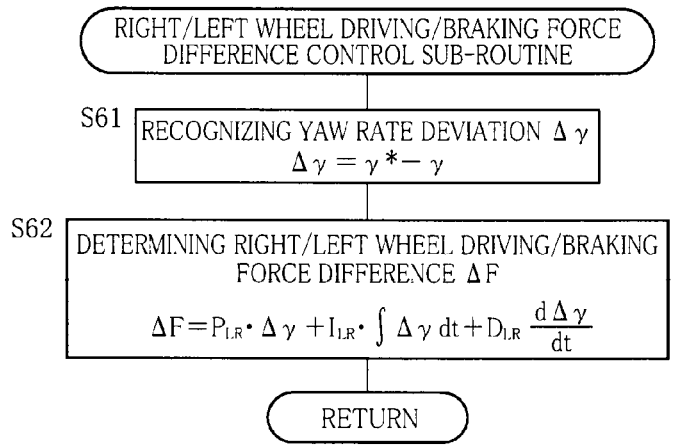
FIG. 15 is a flow chart showing a right/left wheel driving/braking force difference control sub-routine executed in the turning control sub-routine of FIG. 13.
Figure 16:
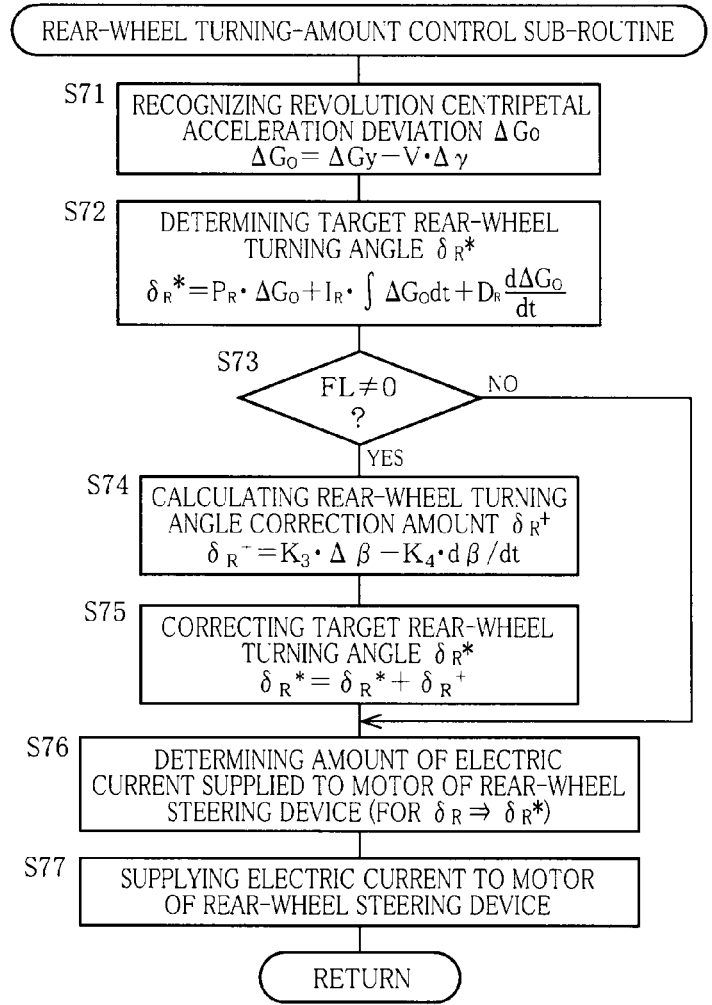
FIG. 16 is a flow chart showing a rear-wheel turning-amount control sub-routine executed in the turning control sub-routine of FIG. 13.

The turning control of the above-described S3 is performed by executing a turning control sub-routine shown in a flow chart of FIG. 13. In this sub-routine, S41 is implemented by executing a front-wheel turning-amount control, then S42 is implemented by executing a right/left wheel driving/braking force difference control, and then S43 is implemented by executing a rear-wheel turning-amount control. These front-wheel turning-amount control, right/left wheel driving/braking force difference control and rear-wheel turning-amount control are executed by carrying out a front-wheel turning-amount control sub-routine that is shown in a flow chart of FIG. 14, a right/left wheel driving/braking force difference control sub-routine that is shown in a flow chart of FIG. 15 and a rear-wheel turning-amount control sub-routine that is shown in a flow chart of FIG. 16, respectively. Since procedures carried out in accordance with the front-wheel turning-amount control sub-routine and the right/left wheel driving/braking force difference control sub-routine have been described above in detail, the description thereof will not be provided herein.

The rear-wheel turning-amount control sub-routine is initiated with S71, S72 in which the revolution centripetal acceleration deviation $\Delta G_0$ is recognized, and the target rear-wheel turning angle $\delta_R^*$ is determined in accordance with a PID control rule based on the revolution centripetal acceleration deviation $\Delta G_0$. Then, in S73, the slip judgment flag FL is confirmed. When the slip judgment flag FL is not 0, S74 and S75 of the slip managing control are implemented. That is, as described above in detail, a rear-wheel turning angle correction amount se is calculated based on the vehicle-body sideslip-angle deviation ΔB and actual vehicle-body sideslip-angle change dβ/dt, and then the target rear-wheel turning angle $\delta_R^*(=\delta_R^*+\delta_{R'})$ is corrected by the correction amount $\delta_{R'}(=\delta_R^*+\delta_{R'})$. Then, in S76 and S77, an amount of the electric current, which is to be supplied to the electromagnetic motor of the rear-wheel steering device 98R, is determined such that the actual rear-wheel turning angle $\delta_R$, becomes equal to the target rear-wheel turning angle $\delta_R^*$. The electric current is supplied to the motor of the rear-wheel steering device 98R, by the determined amount.

Figure 17:
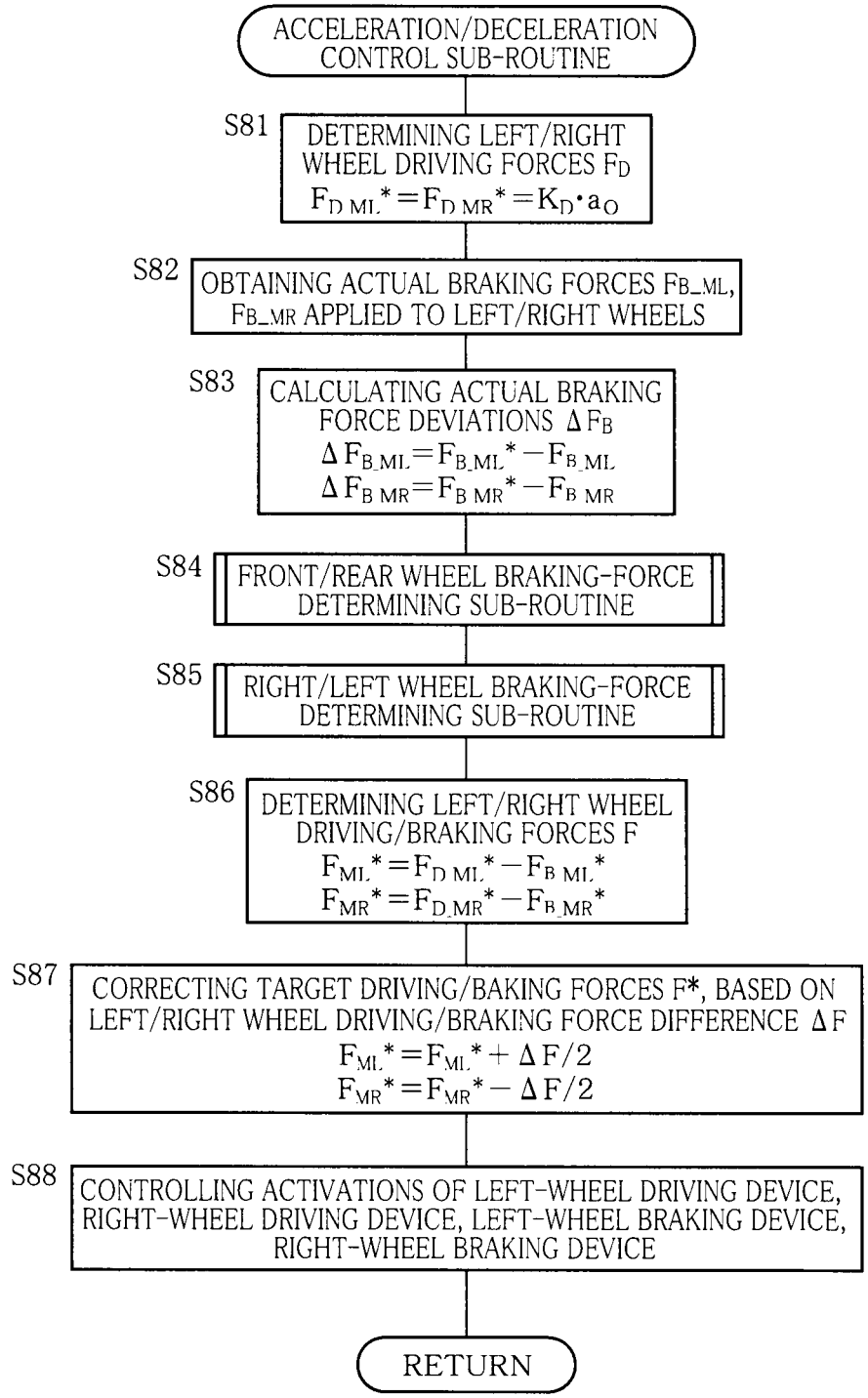
FIG. 17 is a flow chart showing an acceleration/deceleration control sub-routine executed in the vehicle-motion control program of FIG. 10.

The acceleration/deceleration control of the above-described S4 is performed by executing an acceleration/deceleration control sub-routine shown in a flow chart of FIG. 17.

The acceleration/deceleration control sub-routine is initiated with S81 in which the magnitudes of the driving forces $F_{D-ML}^*$, $F_{D-MR}^*$ (that are to be given to the left and right wheels) are determined based on the accelerator pedal operating amount $a_O$. Then, in S82 and S83, the actual braking forces $F_{B-ML}$, $F_{B-MR}$ applied to the left and right wheels 14 are obtained from results of detections made by the braking-force sensors 148, and then deviations $\Delta F_{B-ML}$, $\Delta F_{B-MR}$ of the actual braking forces $F_{B-ML}$, $F_{B-MR}$ from the target braking force $F_{B-ML}^*$, $F_{B-MR}^*$ (that have been determined in a previous execution of the program) are calculated. In S84, the target braking forces applied to the front and rear wheels 12 are determined. In S85, the target braking forces applied to the right and left wheels 14 are determined.

Figure 18:
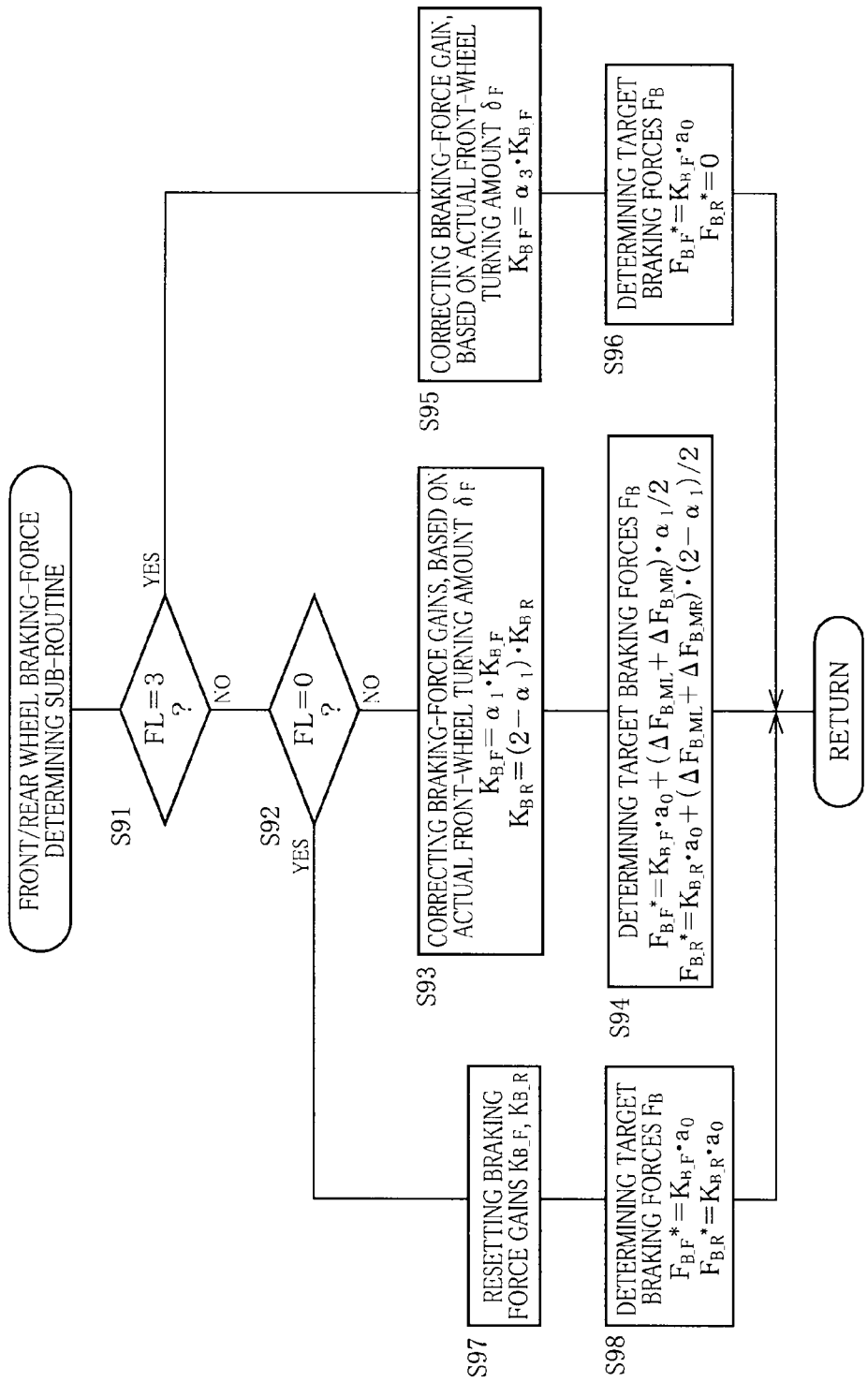
FIG. 18 is a flow chart showing a front/rear wheel braking-force determining sub-routine executed in the acceleration/deceleration control sub-routine of FIG. 17.

The target braking forces applied to the front and rear wheels 12 are determined by executing a front/rear wheel braking-force determining sub-routine that is shown in a flow chart of FIG. 18. This front/rear wheel braking-force determining sub-routine is initiated with S91, S92 in which the slip judgment flag FL is confirmed. When the slip judgment flag FL is 1 or 2, S93 and S94 are implemented. In S93, the braking force gains for the front and rear wheels 12 are corrected based on the correction factor $\alpha_1$ that has been determined based on the actual front-wheel turning amount $S_F$, as described above. In S94, the front-wheel target braking force $F_{B-F}^*$ and the rear-wheel target braking force $F_{B-R}^*$ are determined for compensating deficiencies $\Delta F_{B-ML}$, $\Delta F_{B-R}$ of the braking forces applied to the left and right wheels 14, with the braking forces applied to the front and rear wheels 12. When the slip judgment flag FL is 3, S95 and S96 are implemented. In S95, the braking force gain for the front wheel 12F is corrected based on the correction factor $\alpha_3$ that has been determined based on the actual front-wheel turning amount $\delta_F$. In S96, the target braking force $F_{B-ML}^*$ applied to the front wheel 12F is determined based on the braking force gain, while the target braking force $F_{B-MR}^*$ applied to the rear wheel 12R is set to 0. When the slip judgment flag FL is 0, the normal control is executed. In S97, the braking force gains for the front and rear wheels 12 are reset to initial values. In S98, the target braking force $F_{B-F}^*$, $F_{B-R}^*$ applied to the front and rear wheels 12 are determined.

Figure 19:
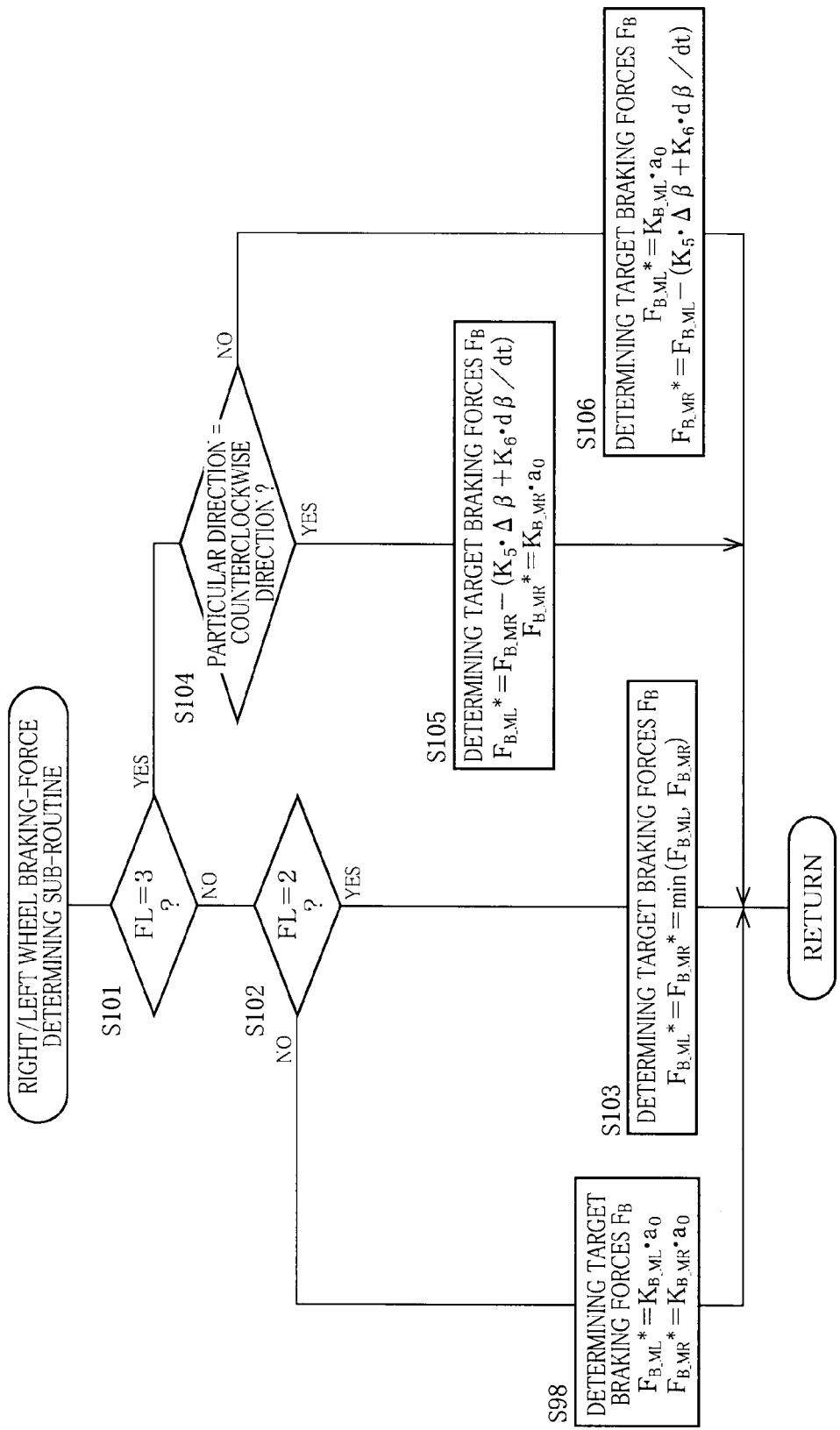
FIG. 19 is a flow chart showing a right/left wheel braking-force determining sub-routine executed in the acceleration/deceleration control sub-routine of FIG. 17.

The target braking forces applied to the right and left wheels 14 are determined by executing a right/left wheel braking-force determining sub-routine that is shown in a flow chart of FIG. 19. This right/left wheel braking-force determining sub-routine is initiated with S101, S102 in which the slip judgment flag FL is confirmed. When the slip judgment flag FL is 2, the control flow goes to S103 in which each of the target braking force $F_{B-ML}^*$, $F_{B-MR}^*$ is set to the magnitude of a smaller one of the braking forces $F_{B-ML}$, $F_{B-MR}$, for causing the magnitude of a larger one of the braking forces $F_{B-ML}$, $F_{B-MR}$ to be reduced to the magnitude of the smaller one of the braking forces $F_{B-ML}$, $F_{B-MR}$. When the slip judgment flag FL is 3, S104-S106 are implemented for causing the braking force applied to one of the left and right wheels $14M_L$, $14M_R$, which is to be displaced rearwardly relative to the other of the wheels $14M_L$, $14M_R$, to be smaller than the braking force applied to the other of the left and right wheels $14M_L$, $14M_R$. To this end, the target braking forces $F_{B-ML}^*$, $F_{B-MR}^*$ applied to the left and right wheels 14 are determined, such that a corresponding one of the target braking forces $F_{B-ML}^*$, $F_{B-MR}^*$, which is applied to the above-described one of the left and right wheels $14M_L$, $14M_R$, is smaller than the actual braking force applied to the other of the left and right wheels $14M_L$, $14M_R$, by an amount based on the vehicle-body sideslip-angle deviation Δβ and the actual vehicle-body sideslip-angle change dβ/dt. When the slip judgment flag FL is 0 or 1, the target braking force $F_{B-ML}^*$, $F_{B-MR}^*$ are determined based on the operating amount $b_O$ of the brake pedal, for executing the normal control.

Then, in the acceleration/deceleration control sub-routine, S86 is implemented to determine the target driving/braking forces F* applied to the left and right wheels 14, based on the target driving forces $F_D^*$ and the target braking forces $F_B^*$. S87 is implemented to correct the target driving/braking forces F*, based on the right/left wheel driving/braking force difference ΔF. Thus, the acceleration/deceleration control sub-routine is completed whereby one cycle of execution of the vehicle-motion control program is completed.

<Functional Composition of Electronic Control Unit>

Figure 20:
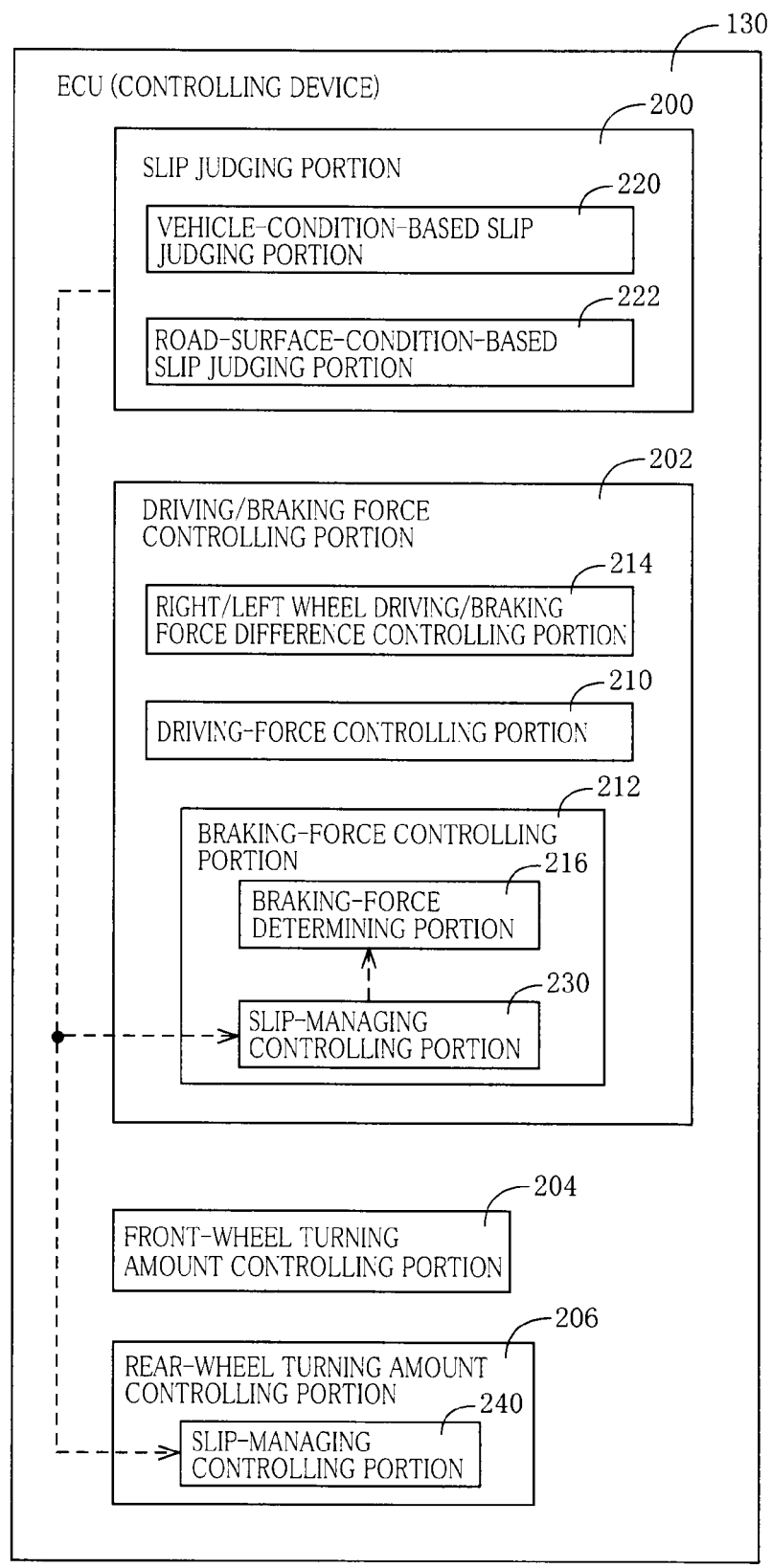
FIG. 20 is a block diagram relating to functions of an electronic control unit serving as a controlling device of the vehicle motion control system according to the embodiment of the claimable invention.

The ECU 130 functions as an electronic control unit for controlling motion of the vehicle by executing the above-described controls. In this regard, the ECU 130 can be considered to have various functional portions for carrying out the above-described procedures. Described in detail, as shown in FIG. 20, the ECU 130 can be considered to have a slip judging portion 200, a driving/braking force controlling portion 202, a front-wheel turning amount controlling portion 204 and a rear-wheel turning amount controlling portion 206. The slip judging portion 200 is a functional portion configured to implement S31-S33, so as to judge whether the vehicle is in the direction-change situation that the slip-induced vehicle-direction change is being induced and/or whether the vehicle is in the direction-change risk situation that there is a risk that the slip-induced vehicle-direction change could be induced. The driving/braking force controlling portion 202 is a functional portion configured to execute the above-described acceleration/deceleration control sub-routine so as to control the braking forces applied to the front and rear wheels 12 and the driving/braking forces applied to the left and right wheels 14. The front-wheel turning amount controlling portion 204 is a functional portion configured to execute the above-described front-wheel turning-amount control sub-routine so as to control the turning amount of the front wheel 12F. The rear-wheel turning amount controlling portion 206 is a functional portion configured to execute the above-described rear-wheel turning-amount control sub-routine so as to control the turning amount of the rear wheel 12R. Further, the driving/braking force controlling portion 202 can be considered to have a driving-force controlling portion 210, a braking-force controlling portion 212 and a right/left wheel driving/braking force difference controlling portion 214. The driving-force controlling portion 210 is a functional portion configured to implement S81 of the acceleration/deceleration control sub-routine so as to control the driving forces. The braking-force controlling portion 212 is a functional portion configured to implement S82-S85 of the acceleration/deceleration control sub-routine so as to control the braking forces. The right/left wheel driving/braking force difference controlling portion 214 is a functional portion configured to execute the above-described right/left wheel driving/braking force difference control. It is noted that the braking-force controlling portion 212 can be considered to have a target braking-force determining portion 216 configured to determine the target braking force, based on a product of the brake-pedal operating amount and the braking force gain.

Further, the above-described slip judging portion 200 can be considered to have a vehicle-condition-based slip judging portion 220 and a road-surface-condition-based slip judging portion 222. The vehicle-condition-based slip judging portion 220 is configured to implement S33 of the slip-judgment sub-routine so as to judge that the slip-induced vehicle-direction change is being induced when the yawing index f(β) exceeds a threshold value. The road-surface-condition-based slip judging portion 222 is configured to implement S31 and S32 so as to judge, when the vehicle is running on a crossover road, that there is a risk that the slip-induced vehicle-direction change could be induced. Further, the braking-force controlling portion 212 and the rear-wheel turning amount controlling portion 206 can be considered to have respective slip-managing controlling portions 230, 240 each configured to execute the slip managing control, based on judgment made by the slip judging portion 200.

<Effect of Vehicle Motion Control System>

As described above in detail, in a special wheel-arrangement vehicle as the present vehicle, when the vehicle is braked in the direction-change situation that the slip-induced vehicle-direction change is being induced and/or when the vehicle is braked in the direction-change risk situation that there is a risk that the slip-induced vehicle-direction change could be induced, there is a case where a turning moment, which is applied to the vehicle body as a result of application of the braking force to the front wheel, suppresses the change of the heading direction of the vehicle induced by wheel slip, and also a case where the turning moment enhances the change of the heading direction of the vehicle. Whether the turning moment suppresses or enhances the change of the heading direction of the vehicle depends on a direction of turning of the front wheel. However, according to the vehicle motion control system of the present embodiment, it is possible to avoid enhancement of the change of the heading direction of the vehicle induced by wheel slip or to effectively suppress the change of the heading direction of the vehicle, by changing the magnitude of the braking force applied to the front wheel, depending on the direction of turning of the front wheel, so that stability of the vehicle during running can be improved.

<Modification>

In the vehicle motion control system of the above-described embodiment, the three types of the slip managing control are switchable thereamong such that one of the three types is selected depending on the value of the yawing index ΔO. However, this arrangement is not essential. For example, the arrangement may be modified such that the third control is executed for causing the braking force of the rear wheel 12R to be zeroed, in a case when it is judged that the vehicle is running on a crossover road with the rear wheel 12R passing on a portion of the road surface having a low friction coefficient, i.e., a friction coefficient $\mu_R$, lower than a given value. This modification is based on consideration that, in such as case, the braking force applied to the rear wheel 12R cannot be increased.

Figure 21:
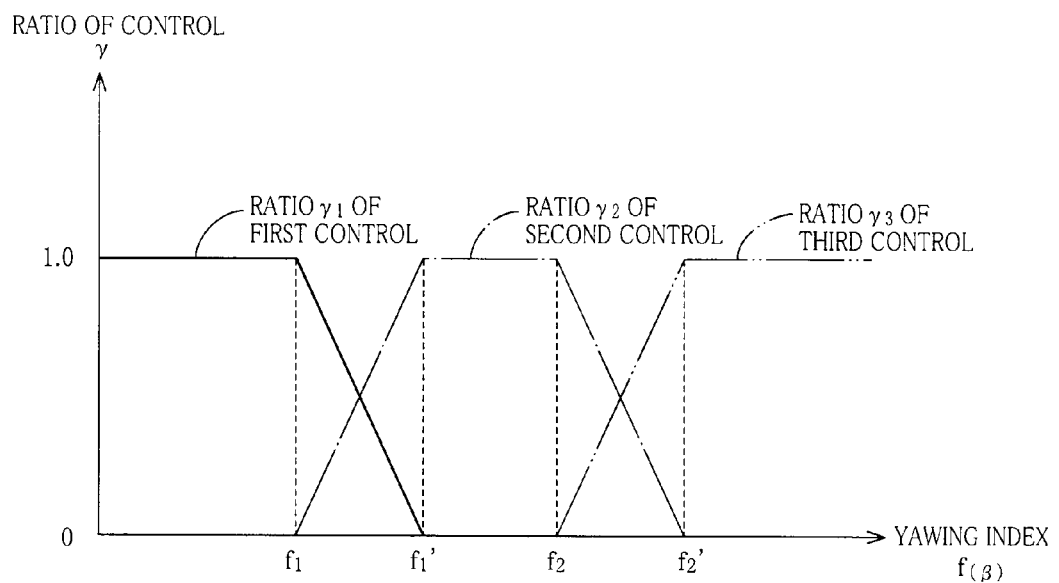
FIG. 21 is a view showing a relationship between a yawing index and a proportion among different types of the slip managing control that are switchable thereamong, in a modification of the vehicle motion control system.

Further, the three types of the slip managing control may be switched thereamong, in a gradual manner, depending on the yawing index f(β). Specifically described, as shown in FIG. 21, it is possible to execute a combination of the first and second controls, with a proportion between the first and second controls being determined depending on the yawing index f(β), and to execute a combination of the second and third controls, with a proportion between the second and third controls being determined depending on the yawing index f(β). In this modification, the combination of the two controls is executed with target values each of which may be a sum of a value relating to one of the two controls and a value relating to the other of the two controls, wherein the value relating to the one of the two controls is a product of a target value determined in the one of the two controls and a ratio of the one of the two controls, while the value relating to the other of the two controls is a product of a target value determined in the other of the two controls and a ratio of the other of the two controls.

DESCRIPTION OF REFERENCE SIGNS

10: vehicle body 12F: front wheel 12R: rear wheel $14M_L$: left wheel $14M_R$: right wheel 20: steering wheel (steering operating member) 22: accelerator pedal 24: brake pedal (brake operating member) $64M_L$: left-wheel driving device $64M_R$: right-wheel driving device $70M_L$: left-wheel braking device $70M_R$: right-wheel braking device 98F: front-wheel steering device 98R: rear-wheel steering device 114F: front-wheel braking device 114R: rear-wheel braking device 130: electronic control unit (ECU, controlling device) 132: wheel velocity sensor [v] 134: steering sensor [θ] 136: accelerator pedal sensor [$a_O$] 138: brake pedal sensor [$b_O$] 140: longitudinal acceleration sensor [Gx] 142: lateral acceleration sensor [Gy] 144: yaw rate sensor [γ] 146F: front-wheel turning angle sensor [$δ_F$] 146R: rear-wheel turning angle sensor [$δ_R$] 148: braking-force sensor [FB] 200: slip judging portion 202: driving/braking force controlling portion 204: front-wheel turning amount controlling portion 206: rear-wheel turning amount controlling portion 210: driving-force controlling portion 212: braking-force controlling portion 214: right/left wheel driving/braking force difference controlling portion 216: target braking-force determining portion 220: vehicle-condition-based slip judging portion 222: road-surface-condition-based slip judging portion 230: slip-management controlling portion (≤braking-force controlling portion) 240: slip-management controlling portion (≤rear-wheel turning amount controlling portion)

v: wheel velocity θ: operating angle of steering wheel $a_O$: operating amount of accelerator pedal $b_O$: operating amount of brake pedal $δ_F$: front-wheel turning angle $δ_F^*$: target front-wheel turning angle $δ_R$: rear-wheel turning angle $δ_R^*$: target rear-wheel turning angle $δ_{R'}$: rear-wheel turning angle compensation amount $F_{B-F}^*$: target front-wheel braking force $F_{B-R}^*$: target rear-wheel braking force $F_{B-ML}$ actual left-wheel braking force $F_{B-ML}^*$: target left-wheel braking force $F_{B-MR}$: actual right-wheel braking force $F_{B-MR}^*$: target right-wheel braking force $F_{ML}$: left-wheel driving/braking force $F_{MR}$: right-wheel driving/braking force ΔF: right/left wheel driving/braking force difference V: vehicle running velocity (running velocity) ρ: slip ratio μ: friction coefficient β: actual vehicle-body sideslip angle Δβ: vehicle-body sideslip-angle deviation f(β): yawing index $α_1$, $α_3$: braking-force gain correction factor $K_{B-F}$: front-wheel braking force gain $K_{B-R}$: rear-wheel braking force gain $K_{B-ML}$: left-wheel braking force gain $K_{B-MR}$: right-wheel braking force gain

The invention claimed is:

1. A vehicle motion control system which is to be installed on a vehicle having a single front wheel, a right wheel and a left wheel, the single front wheel being disposed in a widthwise center of a front portion of the vehicle, the right and left wheels being disposed in respective right and left portions of the vehicle and located on a rear side of the single front wheel, said control system being configured to control motion of the vehicle, said control system comprising:
a front-wheel steering device configured to steer the front wheel;
a braking device configured to apply a braking force to each of the front wheel and right and left wheels; and
a controlling device configured to execute control of the vehicle, said controlling device including a braking-force controlling portion configured to control the braking force that is to be applied to each of the front wheel and right and left wheels, by controlling said braking device in accordance with an operation applied to a brake operating member;
wherein said braking-force controlling portion includes a slip-management controlling portion configured, when the vehicle is to be braked in a direction-change situation that there is a change of a heading direction of the vehicle toward a particular direction due to slip of at least one of the right and left wheels and/or when the vehicle is to be braked in a direction-change risk situation that there is a risk of the change of the heading direction of the vehicle toward the particular direction, to execute a slip managing control for managing the change of the heading direction of the vehicle, such that a magnitude of the braking force applied to the front wheel varies depending on a direction of turning of the front wheel, even with a same operation being applied to the brake operating member, and
wherein said slip-management controlling portion of said braking-force controlling portion is configured, in execution of the slip managing control, to suppress the change of the heading direction of the vehicle, by controlling the braking force applied to the front wheel, such that the braking force applied to the front wheel is made larger when the front wheel is turned in a direction same as the particular direction, than when the front wheel is turned in a direction opposite to the particular direction.

2. The vehicle motion control system according to claim 1, wherein said controlling device includes a slip judging portion configured to judge whether the vehicle is in the direction-change situation and/or whether the vehicle is in the direction-change risk situation,
wherein said slip judging portion is configured to judge that the vehicle is in the direction-change situation or that the vehicle is in the direction-change risk situation, when the vehicle is running on a road surface with the right and left wheels passing on respective portions of the road surface which have respective friction coefficients different from each other,
and wherein said slip-management controlling portion is configured to execute the slip managing control, based on judgment made by said slip judging portion.

3. The vehicle motion control system according to claim 2, wherein said slip-management controlling portion is configured to regard that the front wheel is turned in a direction same as the particular direction when the front wheel is turned in a direction toward a high-friction coefficient portion of the road surface away from a low-friction coefficient portion of the road surface which has a lower friction coefficient than the high-friction coefficient portion of the road surface, and is configured to regard that the front wheel is turned in a direction opposite to the particular direction when the front wheel is turned in a direction toward the low-friction coefficient portion of the road surface away from the high-friction coefficient portion of the road surface.

4. The vehicle motion control system according to claim 3, wherein said slip-management controlling portion is configured to execute the slip managing control such that the braking force applied to the front wheel is larger when the front wheel is turned by a large amount in the direction toward the high-friction coefficient portion of the road surface away from the low-friction coefficient portion of the road surface, than when the front wheel is turned by a small amount in the direction toward the high-friction coefficient portion of the road surface away from the low-friction coefficient portion of the road surface.

5. The vehicle motion control system according to claim 3, wherein said slip-management controlling portion is configured to execute the slip managing control such that the braking force applied to the front wheel is smaller when the front wheel is turned by a large amount in the direction toward the low-friction coefficient portion of the road surface away from the high-friction coefficient portion of the road surface, than when the front wheel is turned by a small amount in the direction toward the low-friction coefficient portion of the road surface away from the high-friction coefficient portion of the road surface.

6. The vehicle motion control system according to claim 1, wherein said controlling device includes a slip judging portion configured to judge whether the vehicle is in the direction-change situation and/or whether the vehicle is in the direction-change risk situation, wherein said slip judging portion is configured to judge that the vehicle is in the direction-change situation, when a yawing index indicating a degree of change of the heading direction of the vehicle exceeds a threshold value, and wherein said slip-management controlling portion is configured to execute the slip managing control, based on judgment made by said slip judging portion.

7. The vehicle motion control system according to claim 1, wherein said slip-management controlling portion is configured to execute the slip managing control such that the braking force applied to the front wheel is made larger when an amount of turning of the front wheel in the direction same as the particular direction is large, than when the amount of turning of the front wheel in the direction same as the particular direction is small.

8. The vehicle motion control system according to claim 1, wherein said slip-management controlling portion is configured to execute the slip managing control such that the braking force applied to the front wheel is made smaller when an amount of turning of the front wheel in the direction opposite to the particular direction is large, than when the amount of turning of the front wheel in the direction opposite to the particular direction is small.

9. The vehicle motion control system according to claim 1, being configured to control the motion of the vehicle further having a single rear wheel located on a rear side of the right and left wheels, wherein said braking device is configured to apply the braking force to each of the front wheel, right and left wheels and rear wheel, wherein said braking-force controlling portion is configured to control the braking force that is to be applied to each of the front wheel, right and left wheels and rear wheel, and wherein said slip-management controlling portion is configured to execute the slip managing control such that a magnitude of the braking force applied to the rear wheel varies depending on a direction of turning of the front wheel, even with a same operation being applied to the brake operating member.

10. The vehicle motion control system according to claim 9, wherein said slip-management controlling portion is configured to execute the slip managing control, such that the braking force applied to the front wheel is smaller when the front wheel is turned in the direction opposite to the particular direction, than when the front wheel is turned in the direction same as the particular direction, and such that the braking force applied to the rear wheel is made larger when the front wheel is turned in the direction opposite to the particular direction, than when the front wheel is turned in the direction same as the particular direction.

11. The vehicle motion control system according to claim 10, wherein said slip-management controlling portion is configured to execute the slip managing control, such that a sum of the braking force applied to the front wheel and the braking force applied to the rear wheel is constant while a same operation is being applied to the brake operating member.

12. The vehicle motion control system according to claim 1, wherein said slip-management controlling portion is configured to execute the slip managing control such that the braking force applied to one of the right and left wheels, which is displaced rearwardly relative to the other of the right and left wheels upon rotation of the vehicle in the particular direction, is reduced.

13. The vehicle motion control system according to claim 1, being configured to control the motion of the vehicle further having a single rear wheel located on a rear side of the right and left wheels, said vehicle motion control system comprising a rear-wheel steering device configured to steer the rear wheel, wherein said rear-wheel steering device includes a drive source, and is configured to turn the rear wheel, relying on a force generated by said drive source, without relying on a force applied to a steering operating member, wherein said controlling device includes a rear-wheel turning amount controlling portion that is configured to control an amount of turning of the rear wheel, by controlling said drive source included in said rear-wheel steering device, based on an operation applied to said steering operating member, and wherein said rear-wheel turning amount controlling portion includes a slip-management controlling portion that is configured, when the slip managing control is executed by said slip-management controlling portion included in said braking-force controlling portion, to control the amount of turning of the rear wheel, for managing the change of the heading direction of the vehicle, such that the rear wheel is turned in a direction same as the particular direction.

14. The vehicle motion control system according to claim 13, wherein said braking device is configured to apply the braking force to each of the front wheel, right and left wheels and rear wheel, wherein said braking-force controlling portion is configured to control the braking force that is to be applied to each of the front wheel, right and left wheels and rear wheel, and wherein said slip-management controlling portion included in said braking-force controlling portion is configured to cause the magnitude of the braking force applied to the rear wheel, to become zero, when a yawing index indicating a degree of change of the heading direction of the vehicle exceeds a given value.

* * * * *